United States Patent
Mishra

(10) Patent No.: US 9,305,216 B1
(45) Date of Patent: Apr. 5, 2016

(54) CONTEXT-BASED DETECTION AND CLASSIFICATION OF ACTIONS

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/570,169

(22) Filed: Dec. 15, 2014

(51) Int. Cl.
    *G06K 9/00* (2006.01)
    *G06K 9/46* (2006.01)
    *G06K 9/62* (2006.01)
    *G06F 17/30* (2006.01)

(52) U.S. Cl.
    CPC ...... *G06K 9/00624* (2013.01); *G06F 17/30244* (2013.01); *G06K 9/4604* (2013.01); *G06K 9/6267* (2013.01)

(58) Field of Classification Search
    CPC ............ G06K 9/00624; G06K 9/4604; G06K 9/6267; G06K 17/30244; H04L 12/2803; H04L 12/2829; H04L 67/12; H04W 4/006; H04W 4/027
See application file for complete search history.

(56) References Cited

U.S. PATENT DOCUMENTS

| | | | | |
|---|---|---|---|---|
| 6,678,413 | B1* | 1/2004 | Liang | A61B 5/1113 348/169 |
| 2009/0261978 | A1* | 10/2009 | Lee | H04L 12/2803 340/573.1 |

* cited by examiner

*Primary Examiner* — Tom Y Lu
(74) *Attorney, Agent, or Firm* — Athorus, PLLC

(57) ABSTRACT

Actions or activities occurring within an environment may be detected, recognized and classified based on the presence or absence of objects within the environment, which may be recognized within imaging data. The states or changes in states of the objects may be tracked within the imaging data and associated with one or more actions or activities with various probabilities. By tracking the motion of objects, rather than the motion of humans or other actors, the detection and classification of actions or activities may be performed more quickly and efficiently, and may be used to determine the timing associated with one or more steps of such activities, as well as whether each of the steps of an activity has been satisfactorily performed and in an appropriate order.

21 Claims, 13 Drawing Sheets

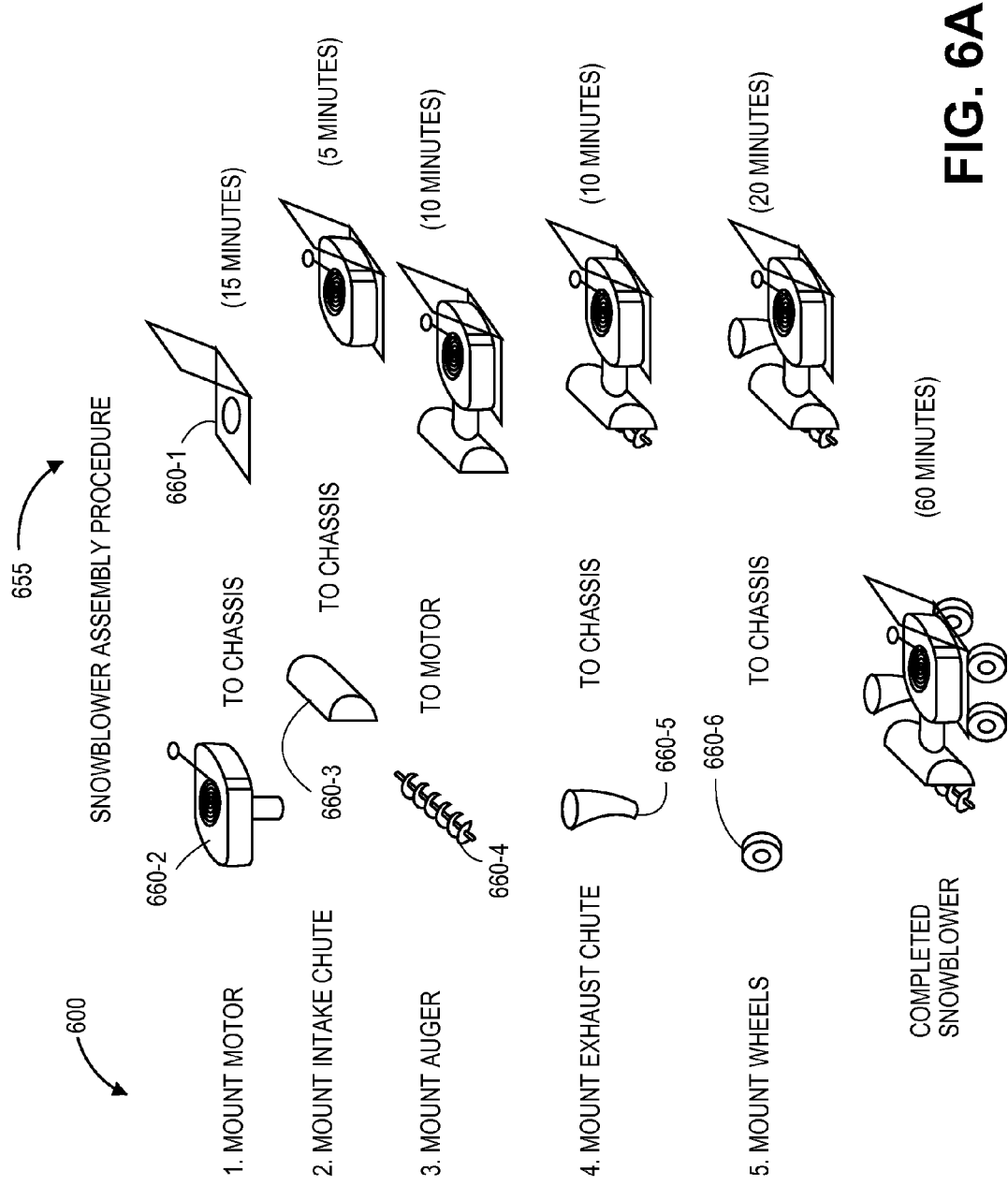

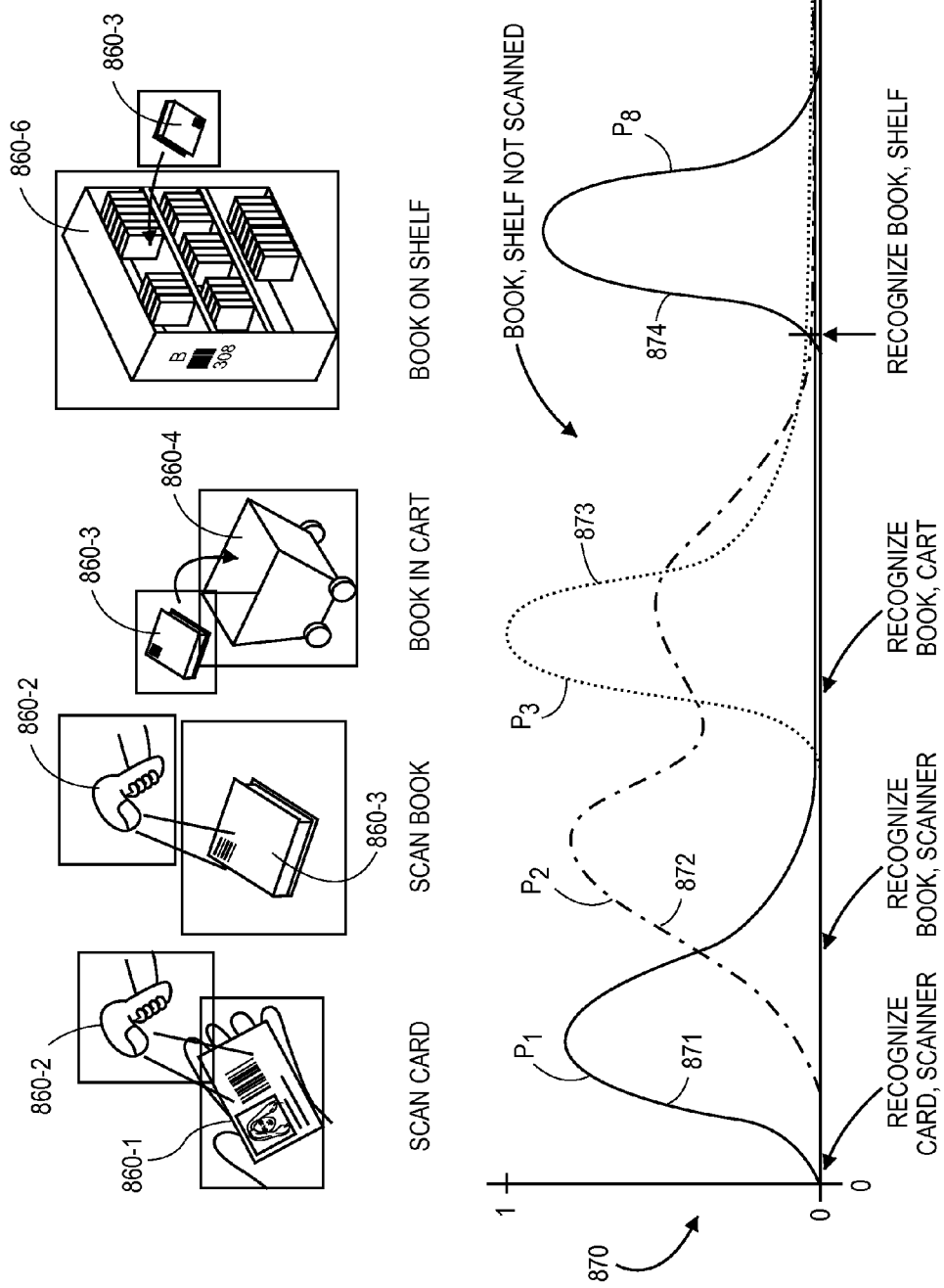

CONTEXT-BASED DETECTION AND CLASSIFICATION OF ACTIONS

BACKGROUND

Machine vision systems and methods are frequently used to detect people, objects or activities from imaging data that typically includes still or moving images as well as other information, data or metadata. Such systems and methods are commonly provided in environments where an ever-changing variety of people may be present, and where any number of actions may be occurring. In particular, machine vision systems and methods are commonly applied in industrial or commercial environments for the purpose of detecting and classifying human actions and activities. Such systems and methods may operate by detecting and recognizing a person within one or more environments, tracking movements of the person's arms, legs, head, torso or other body parts, and classifying an action that was performed by the person based on his or her tracked movements.

The detection and classification of human actions and activities from imaging data by machine vision systems may be complicated, however, by one or more intrinsic or extrinsic factors. For example, machine vision systems typically attempt to recognize actions or activities involving humans by recognizing the movement of limbs or other body parts in a particular fashion, e.g., a particular gait or other type or form of rhythmic or arrhythmic motion. Therefore, in order to recognize an action or activity from a set of imaging data, e.g., one or more still or moving images, such systems and methods must first identify a human within the set of imaging data, and determine whether the human is engaged in an action or an activity, before classifying the action or activity based on his or her motion. Where a number of imaging devices are provided in one or more scenes of an environment for the purpose of observing actions or activities occurring therein, however, the variations in the conditions of each of the scenes, or the orientations or configurations of the respective imaging devices provided therein, may lead to erratic or inconsistent results. Next, the various portions of the imaging data (e.g., digital images, or clips of digital video data) captured from a given imaging device may fail to cover or include each of the elements associated with a given action, and thus provide an incomplete or unreliable prediction as to the action observed therein.

Moreover, the accuracy or precision with which a machine vision system detects and classifies a human action or activity may be hindered based on the inherently unique characteristics of the human body. For example, no two humans are exactly alike, and each human may perform the same actions or activities in vastly different ways. Therefore, identifying the performance of an action or an activity by different humans typically requires individualized analyses of the respective motions of the respective humans, which frequently requires an extensive amount of processing power, network bandwidth or data storage capacity. Similarly, a single person may perform two or more different tasks using remarkably similar motions of his or her limbs or other body parts. Distinguishing between the discrete tasks in view of such similar motions may further occupy substantial portions of the available power, bandwidth or storage capacity of a computer system, as well.

BRIEF DESCRIPTION OF THE DRAWINGS

FIGS. 6A and 6B are views of aspects of one system for context-based detection and recognition of actions in accordance with embodiments of the present disclosure.

FIGS. 8A and 8B are views of aspects of one system for context-based detection and recognition of actions in accordance with embodiments of the present disclosure.

DETAILED DESCRIPTION

As is set forth in greater detail below, the present disclosure is directed to detecting and classifying actions or activities occurring within an environment based on a context in which such actions or activities are observed by one or more imaging devices. More specifically, the systems and methods disclosed herein are directed to analyzing imaging data (e.g., still or moving images, as well as any associated information or data) captured from a monitored scene using one or more imaging devices, identifying contextual cues within the foreground of the monitored scene based on the presence or absence of one or more objects including but not limited to tools, implements, aids, vehicles, structures or items of any type or form therein, as well as one or more states of such objects, e.g., one or more attributes or characteristics of any motion or other conditions of the objects.

Once the contextual cues within a scene of an environment, e.g., not only the objects recognized as present therein but also the states or changes in states of such objects, have been identified, the contextual cues may be leveraged in order to narrow a set of possible actions or activities that may have occurred within the scene and been captured within the imaging data, thereby facilitating the process by which a predicted action or activity is identified. Moreover, changes in states of the objects may be evaluated to determine a level of efficiency during the performance of an action, or a level of compliance with one or more established standards. An action or an activity may be detected and classified based on the presence or absence of a single object within the scene, or multiple objects within the scene, as well as the states of such objects as expressed within the imaging data.

Figure 1A:
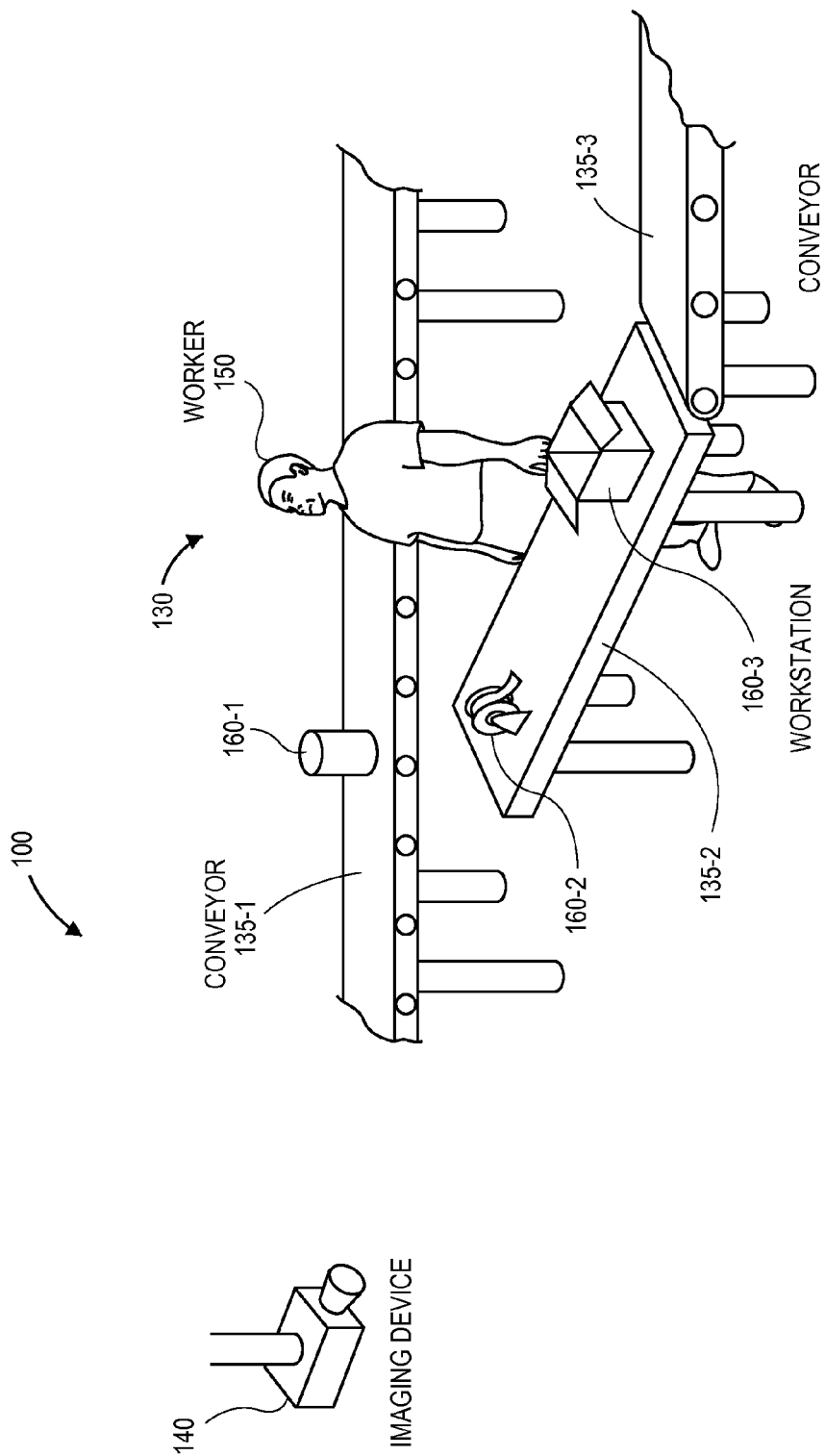
FIGS. 1A, 1B, 1C and 1D are views of aspects of one system for context-based detection and recognition of actions in accordance with embodiments of the present disclosure.
Figure 1B:
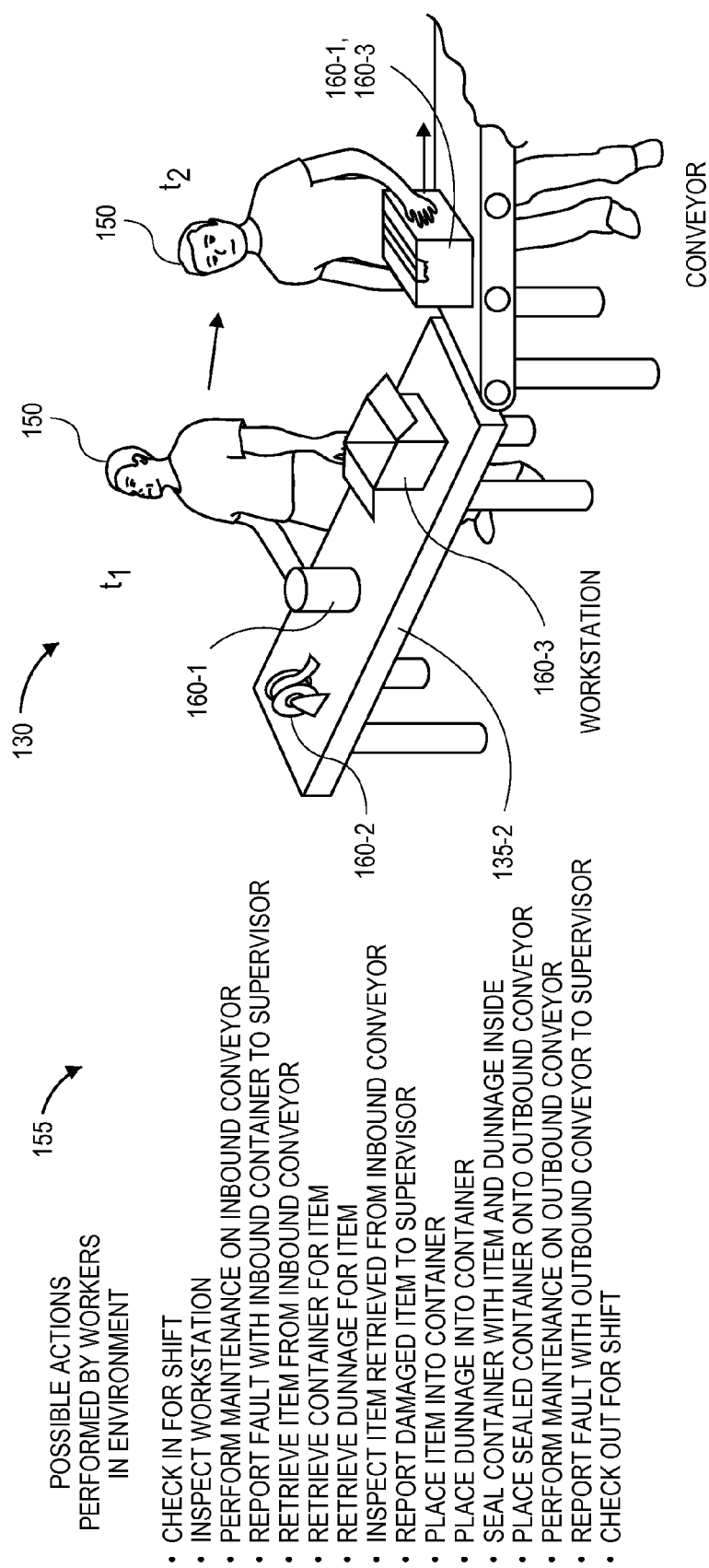

Referring to FIGS. 1A, 1B, 1C and 1D, a system 100 including a working environment 130, an imaging device 140 and a worker 150 is shown. The working environment 130 includes an inbound conveyor 135-1, a workstation 135-2 and an outbound conveyor 135-3. As is shown in FIG. 1A, the inbound conveyor 135-1 includes an item 160-1 that is to be packed into a container 160-3 and delivered to a predetermined destination. As is also shown in FIG. 1B, the workstation 135-2 further includes a roll 160-2 of adhesive (e.g., packing tape) and the container 160-3 (e.g., a cardboard box) thereon.

Referring to FIG. 1B, a portion of the working environment 130 of FIG. 1A is shown for a period of time extending between time $t_1$ and time $t_2$. As is shown in FIG. 1B, at time $t_1$, the worker 150 has retrieved the item 160-1 from the inbound conveyor 135-1, and placed the item 160-1 onto the workstation 135-2 alongside the roll 160-2 and the open container 160-3. At time $t_2$, the respective states of the item 160-1, the roll 160-2 and the container 160-3 have changed, as the worker 150 has sealed the item 160-1 within the container 160-3 using at least some of the adhesive 160-2 that was provided on the roll 160-2 as of time $t_1$, and placed the container 160-3, sealed by the adhesive and with the item 160-1 therein, onto the outbound conveyor 135-3.

As is shown in FIG. 1B, within the working environment 130, the worker 150 may be performing one or more of a set of possible actions 155. For example, the worker 150 may be checking in for his or her shift, e.g., by punching a time card or making an entry to a computer through one or more user interfaces. The worker 150 may also be inspecting the workstation 135-2, e.g., to ensure that the workstation 135-2 includes a sufficient number or amount of supplies, such as the roll 160-2 of adhesive or the container 160-3. The worker 150 may also perform maintenance on the inbound conveyor 135-1, or report a fault with the inbound conveyor 135-1 to his or her supervisor (not shown) through an electronic or verbal message.

Additionally, the worker 150 may also retrieve an item, e.g., the item 160-1, from the inbound conveyor 135-1, or retrieve a container, e.g., the container 160-3, or dunnage for the item. The worker 150 may further inspect the item retrieved from the inbound conveyor 135-1 or report that the item is damaged to his or her supervisor. If the item is not damaged, the worker 150 may place the item within a container, place dunnage into the container, or seal the container with the item and the dunnage inside, e.g., using the roll 160-2 of adhesive. The worker 150 may place the sealed container onto the outbound conveyor 135-3, perform maintenance on the outbound conveyor 135-3 (as necessary), or report a fault with the outbound conveyor 135-3 to his or her supervisor. Finally, the worker 150 may also check out for his or her shift.

According to the systems and methods of the present disclosure, a set of possible actions 155 that may be performed by an actor within an environment and which may be detected and classified using imaging data (e.g., one or more still or moving images) captured from the environment may be narrowed based on a context associated with the environment that may be determined by identifying one or more objects or entities that are present therein identified therein. The objects or entities may be recognized by providing the imaging data to a first set of classifiers, e.g., one or more support vector machines or other learning models, each of which may be trained to recognize one or more specific objects or entities therein. Once the objects or entities have been recognized, motion of the objects or entities may be subsequently tracked by providing the imaging data to a second set of classifiers, each of which may be trained to recognize a type or kind of motion of the objects or entities. Outputs of the second set of classifiers may be used to generate probabilities that the motion is associated with one or more predetermined activities, or is not associated with any previously known activities.

Figure 1C:
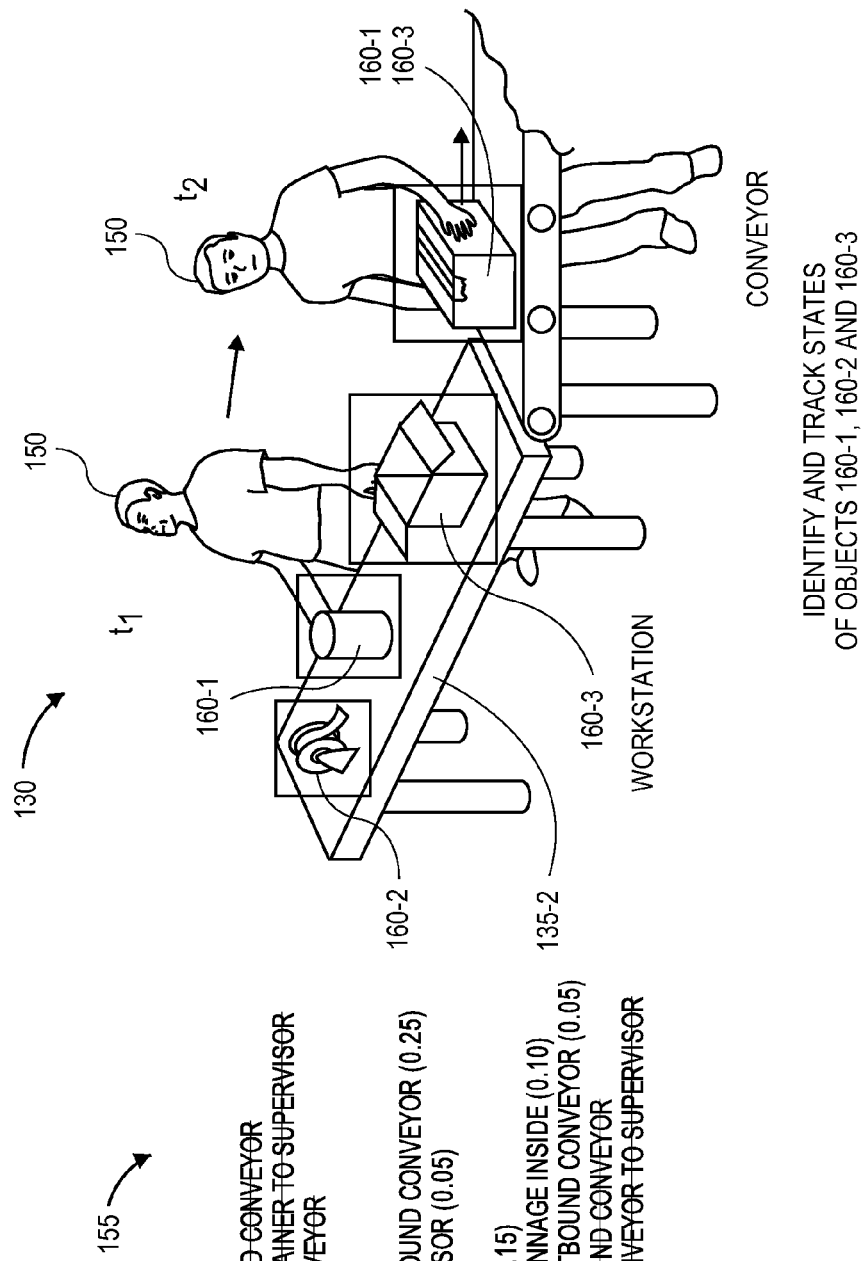

Referring to FIG. 1C, the portion of the working environment 130 of FIG. 1B is shown, with the roll 160-2 of adhesive, the item 160-1 and the container 160-3 as having been recognized on the workstation 135-2 at time $t_1$, and with the container 160-3 as having been recognized as sealed with the item 160-1 therein on the outbound conveyor 135-3 at time $t_2$. Based on the observed state of the item 160-1 (e.g., stationary, on the workstation 135-2), the presence of the roll 160-2 and the observed state of the container 160-3 (e.g., open, on the workstation 135-2) as of time $t_1$, and the absence of the item 160-1 and the observed state 160-3 (e.g., sealed by a portion of the adhesive on the roll 160-2 at time $t_1$) as of time $t_2$, the set of possible actions 155 that could have been performed by the worker 150 between time $t_1$ and time $t_2$ may be narrowed considerably.

For example, whether the worker 150 is checking in for his shift or inspecting the workstation 135-2 may be ruled out, as the worker 150 is already working, and the workstation 135-2 has a number of objects 160-1, 160-2, 160-3 thereon. Similarly, whether the worker 150 is performing maintenance on the inbound conveyor 135-1, or reporting a fault with the inbound conveyor 135-1, may also be ruled out, as the worker 150 is apparently not taking any actions with regard to the inbound conveyor 135-1 as of time $t_1$. Moreover, because the item 160-1 and the container 160-3 were already located on the workstation 135-2 at time $t_1$, it may be understood that the worker 150 was not retrieving any items from the inbound conveyor 135-1, or retrieving any containers or dunnage for such items, between time $t_1$ and time $t_2$.

As is shown in FIG. 1C, a probability of 0.25 (or twenty-five percent) has been assigned to whether the worker 150 is inspecting the item 160-1 that was retrieved from an inbound container, and a probability of 0.05 (or five percent) has been assigned to whether the worker 150 is reporting that the item 160-1 is damaged to his or her supervisor. As of time $t_1$, the item 160-1 is on the workstation 135-2 in front of the worker 150, meaning that the worker 150 may, at time $t_1$, be evaluating the suitability or fitness of the item 160-1 and/or reporting any damage to the item 160-1 that he or she may have observed or be observing. Additionally, as of time $t_1$, a probability of 0.40 (or forty percent) has been assigned to placing the item 160-1 in the container 160-3, and a probability of 0.15 (or fifteen percent) has been assigned to placing dunnage into the container 160-3. Finally, as of time t1, a probability of 0.10 (or ten percent) has been assigned to sealing the container 160-3 with the item 160-1 and dunnage therein, and a probability of 0.05 (or five percent) has been assigned to placing a sealed container including the item 160-1 onto the outbound conveyor 135-3. Performing maintenance on the outbound conveyor 135-3, reporting a fault with the outbound conveyor 135-3 or checking out from his or her shift may be ruled out as of time $t_1$.

Figure 1D:
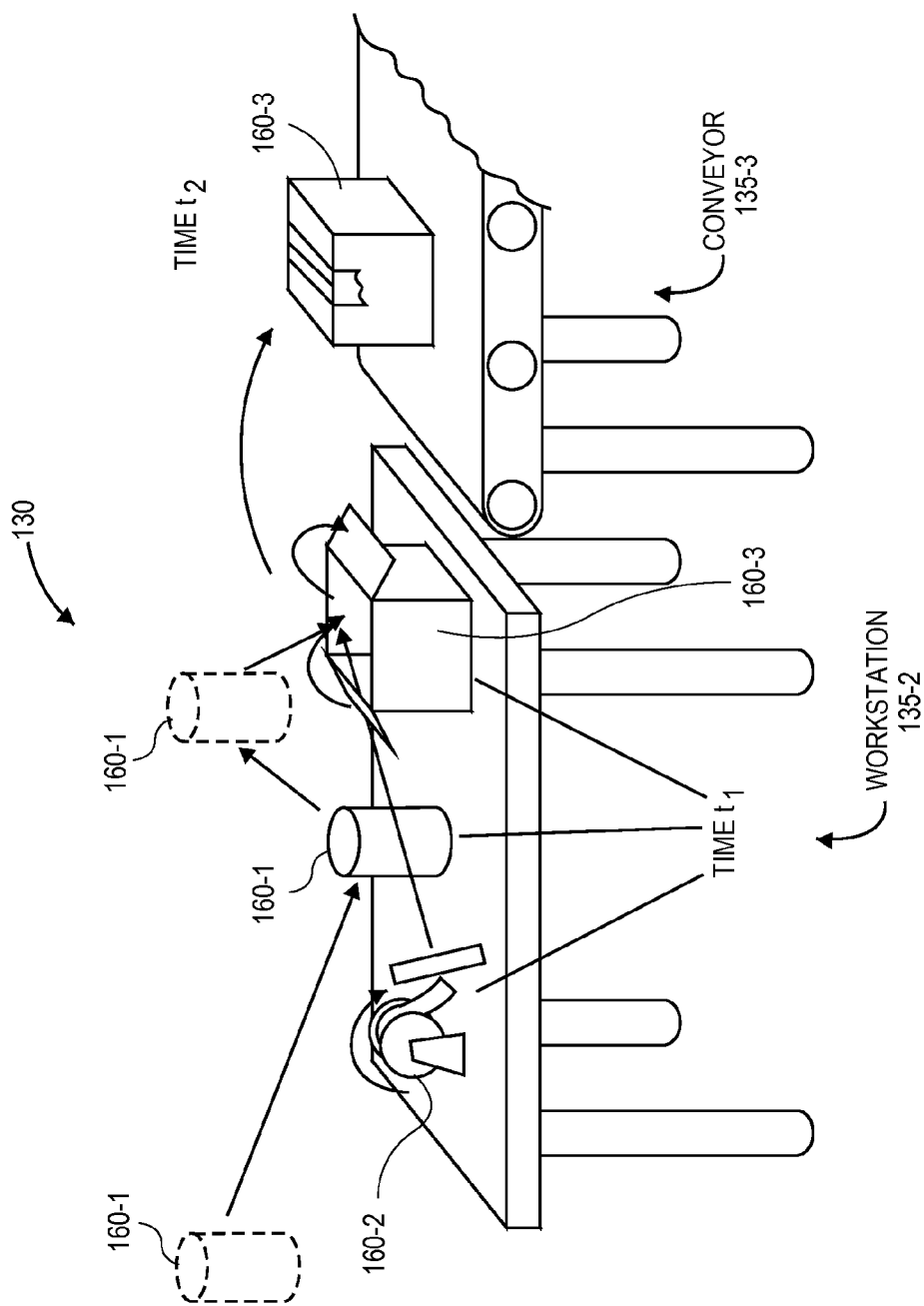

Referring to FIG. 1D, the changes in states of the various objects 160-1, 160-2, 160-3 between time $t_1$ and time $t_2$ is shown. As is shown in FIG. 1D, the item 160-1 is retrieved from prior to time $t_1$, and placed on the workstation 135-2. The item 160-1 is then raised and lifted into the container 160-3 after time $t_1$. Similarly, at time $t_1$, the container 160-3 is fixed in position on the workstation 135-2, but is then closed after the item 160-1 is placed therein, and is sealed with a strip of adhesive taken from the roll 160-2. The container 160-3, with the item 160-1 sealed therein, is then lifted and placed onto the outbound conveyor 135-3 by time $t_2$. Likewise, the roll 160-2 is stationary at time $t_1$, but is rotated to release a strip of adhesive thereafter, and the strip is placed onto the closed container 160-3 prior to time $t_2$, such that the container 160-3 may be removed from the workstation 135-2 with the item 160-1 sealed therein and placed onto the outbound conveyor 135-3 at time $t_2$.

Accordingly, the systems and methods may be utilized to detect and classify an action or an activity performed by a human actor within an environment using imaging data (e.g., still or moving images) captured from the environment by identifying an object or entity expressed therein, determining a state of the object or entity, tracking any changes in the state of the object or the entity (e.g., any type or form of motion of the object or the entity), and identifying the action or activity most likely associated with the object or entity, or the state or the change in state of the object or the entity. The action or activity may be identified by narrowing a set of possible actions or activities that may be performed by the actor, or using the object or the activity, such as by assigning probabilities to each of the actions or activities in the set and selecting the action or the activity having the highest probability.

Further, the systems and methods of the present disclosure may be utilized to determine the actor's efficiency in performing the action or activity, such as by determining a time at which each of the steps or events associated with the action or the activity is performed, or by calculating an elapsed time between each of such steps or events, based on the detection and classification of one or more objects or entities expressed within imaging data, or the states or changes in states of the objects or entities. The systems and methods of the present disclosure may also be utilized to confirm that the actor has performed each of the steps in a predetermined list by detecting and classifying one or more objects or entities within imaging data, and tracking the states or changes in states of the objects or the entities.

Machine vision systems and methods are typically provided in order to enable computers to see, i.e., to visually recognize and identify one or more objects, from imaging data captured by an imaging device, e.g., one or more digital cameras. Such devices operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Once the characteristics of stationary or moving objects or portions thereof have been recognized in one or more digital image, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of machine vision systems and methods may be affected based on the lighting conditions and characteristics of the scenes in which the imaging devices are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Additionally, where machine vision systems or methods are provided in large, dynamic environments, including but not limited to fulfillment centers, such as the working environment 130 of FIG. 1A, and also home or living environments (e.g., yards, living rooms or apartment buildings), retail establishments (e.g., large department stores), transportation facilities (e.g., airports, train stations, bus stations or seaports) or large venues such as stadiums or arenas, the difficulty in detecting and recognizing objects may be heightened due to the scale of such systems or methods, and the computer processing power and capacity that may be required in order to operate them, as well as complexities in the layouts or configurations of their respective scenes. For example, a modern department store may have sections corresponding to men's clothing, women's clothing, children's clothing, shoes, business attire, kitchen appliances, home entertainment centers, and the like, each including racks, shelves, tables or mannequins distributed among various registers, escalators, dressing rooms, passageways and other features. The number of possible actions or activities that may be performed by customers or staff within such a diverse environment is functionally unlimited, and existing machine vision systems and methods do not distinguish between actions performed in particular regions of the environment, or identify or consider the functionality of any of the objects within the environment, when undertaking attempting to detect and recognize actions and activities occurring therein.

Some machine vision systems attempt to detect and classify actions or activities performed by a human actor by sensing aspects of the actor's body and associating the motion of such aspects with one or more actions or activities. Some such models operate by detecting and classifying the kinematic motion of the actor's limbs, extensions or other body parts, as well as the shapes or appearances of such body parts. For example, some kinematic models typically depict a body as a kinematic chain or kinematic tree comprising a plurality of segments that are joined together at joints, with each of the joints having a predetermined number of degrees of freedom associated with a direction of motion. The degrees of freedom of the various segments of the body may define a set or representation of poses, which may be modeled in two or three dimensions (2D or 3D). Accordingly, some such models may determine an activity or pose of a human actor by identifying motion of the human actor and comparing the motion to one or more of the poses of the set. Similarly, a body of a human actor may be modeled as a set of polygons or other shapes, such that motion of the human actor may be identified and classified based on a change in the set of polygons or shapes detected within imaging data captured by one or more imaging devices.

Presently, the real-time detection and classification of actions or activities by actors (e.g., human actors or autonomous mobile robots) within a given scene using imaging data is complicated for a number of reasons. First, depending on the field of view and/or perspective of a given imaging device, temporal variations in the lighting or illumination of a scene, or the background of the scene, may impact the efficacy of a machine vision system or method for recognizing actions or activities. Second, two different actors who are performing the same action or activity may appear differently within imaging data based on differences in their respective sizes, operating speeds, physical deformations or clothing worn, or other relevant factors. Similarly, an actor may perform two or more different actions or activities using similar body motions. Finally, a set of imaging data captured using one or more imaging devices may fail to fully capture each of the motions associated with an action or an activity. Gaps or inconsistencies in the imaging data may lead to inaccurate or speculative predictions of the actions or activities represented therein.

The systems and methods of the present disclosure are directed to detecting and classifying actions or activities occurring within an environment by determining a context of the environment based on the presence or absence of one or more objects or entities therein, or the states of the one or more objects. More specifically, the systems and methods disclosed herein are directed to recognizing one or more objects or entities within imaging data captured using one or more imaging devices, which may be stationary or in motion, and tracking the states or changes in states of the objects or entities. By identifying and tracking the objects or entities within an environment, rather than the actors, some of the difficulties associated with classifying actions or activities based solely on motion of the human body may be avoided.

For example, the actions of smoking a cigar and drinking wine from a glass each involve similar sets of motions by a human, e.g., grasping a slender object with his or her hand, and raising the slender object to his or her mouth for a brief period of time, before removing the slender object from his or her mouth. Thus, traditional machine vision systems and methods which are directed to detecting and classifying actions or activities from the motion of humans as expressed within imaging data may be unable to distinguish between the actions of smoking a cigar or drinking from a glass. The systems and methods of the present disclosure, however, may recognize the presence of a cigar, or a wine glass, as well as the states of the cigar (e.g., whether the cigar is lit or unlit, as well as a length or diameter of the cigar) or the wine glass (e.g., whether the wine glass is empty or at least partially filled by a liquid, as well as an identity or classification of the liquid, such as red, white or pink) within the imaging data, track the states of the cigar or the wine glass (e.g., whether the cigar or the wine glass is raised or lowered and in which manner, as well as changes in the length of the cigar due to burning or a level of a liquid within the wine glass due to drinking or spillage) within the imaging data, and narrow the set of actions or activities that the user might be performing with the cigar or the wine glass based on such states or changes thereof.

Thus, where a cigar is identified in an environment within imaging data, the set of possible actions or activities that may be performed by an actor may be narrowed to include only those actions or activities which involve a cigar, e.g., selling the cigar, purchasing the cigar, lighting the cigar, smoking the cigar or extinguishing the cigar. Subsequently, by tracking the repeated and temporary vertical raising of the cigar to a substantially horizontal orientation at a higher elevation, followed by a vertical lowering of the cigar to a horizontal or angled orientation at a lower elevation, or any other changes in the state of the cigar, it may be determined that the actor is smoking the cigar, and not selling, purchasing, lighting or extinguishing the cigar. Similarly, where a wine glass is identified in an environment within imaging data, the set of possible actions or activities that may be performed by an actor may be narrowed to washing or drying the glass, placing the glass on a shelf or removing the glass therefrom, filling the glass or drinking from the glass. By tracking the repeated and temporary raising and lowering of the glass, and a temporary rotation of the glass from a vertical orientation to an angled or horizontal orientation, and back to the vertical orientation again, or any other changes in the state of the glass, it may be determined that the actor is drinking from the glass, and not washing, drying, storing or filling the glass.

In this regard, a set of potential actions or activities that might occur within an environment may be narrowed based on a context of the environment, as defined by the presence or absence of objects or entities therein, and the states or changes in the states of such objects or entities. For example, where a broom is identified within imaging data captured from one or more imaging devices mounted in a warehouse, it may be reasonably inferred that a worker using the broom is sweeping a floor and not mopping, painting or waxing it. Because detecting objects or entities from imaging data, and tracking their motion or other changes in state, are generally simpler computational tasks than detecting and tracking human motion, due to the fact that objects or entities typically have attributes that are less susceptible to lighting or perspective variations than attributes of humans or human motion, determining and classifying the actions or activities being performed within an environment based on the motion or other changes in state of the objects or entities rather than the motion of humans may be performed more efficiently and effectively. For example, although scissors exist in many types or sizes of scissors, each pair of scissors typically has a common shape, and operates in a substantially similar manner, e.g., based on relative rotation between a pair of blades. Thus, detecting and classifying an object as a pair of scissors, and observing relative motion between the respective blades, may imply that a cutting activity is being undertaken, regardless of the size, shape or working style of the actor who is using the scissors.

Detecting and classifying actions or activities by recognizing and tracking objects or entities within imaging data has any number of potential applications. For example, in a fulfillment center environment, workers are regularly using various objects or entities to perform tasks such as moving packages (e.g., on carts or in totes), scanning packages (e.g., using hand-held readers or scanners), opening packages (e.g., using knives or box-cutters), placing items into totes or other vessels, placing the totes or vessels onto conveyors or carts, pushing the carts to a destination, retrieving the items from the carts, placing the items into bins or shelves, retrieving the items from the bins or shelves, packaging the items into containers and loading the containers onto a delivery vehicle. Detecting tools used by workers in the performance of such tasks, or the items or containers themselves, and tracking their changes in state, which may include but are not limited to linear, translational or rotational motion, may be used to discern which of the actions or activities is being performed by each of the workers. For example, the vertical and/or horizontal changes in position of a tool, as well as changes in rotation or angular alignment of the tool, may be tracked and associated with one or more actions or activities involving the tool. Likewise, attributes of the tool such as color, contours or textures may be further tracked and associated with such actions or activities. For example, during operation, a lawn mower may change in color or texture, and its bag may expand, due to the cutting of grass and the proliferation of the cut grass into the bag and onto one or more external surfaces of the lawn mower. Therefore, the lawn mower may be determined to have been used in operation where one or more external surfaces of the lawn mower turns green or otherwise develops a roughened texture, or where the bag expands in volume and shape. In other environments, imaging data may be evaluated to detect and track vehicles, bicycles, luggage or any other type or form of tool or implement therein, and to classify one or more actions or activities occurring within the environment thereby.

The systems and methods of the present disclosure may calculate or otherwise determine a probability that one or more actions or activities is occurring in a singular or complex fashion. Upon identifying one or more objects or entities, and tracking the states or changes in state of the objects or entities, a probability that such states or changes in state are associated with a given action or activity may be determined, and the action or activity having the highest probability may be selected.

According to some embodiments of the present disclosure, discrete sets of imaging data (e.g., clips or video data files having finite lengths on the order of tens of seconds) may be provided to one or more first classifiers that are each specifically configured to detect and recognize one or more objects or entities therein, as well as one or more states of such objects or entities. Such classifiers may be trained to recognize edges, contours, outlines, colors, textures, silhouettes, shapes or other characteristics of particular objects or entities within an environment, as well as whether such objects are stationary or in motion, or in one or more of a defined set of possible conditions (e.g., the container 160-3 of FIGS. 1A-1D, which is open at time $t_1$ and sealed at time $t_2$). For example, within a fulfillment center environment, the classifiers may be trained to recognize a computer keyboard or other interface, a bin or other item carrier, or one or more accessories for receiving, storing, retrieving, packing or shipping items based on their respective outlines, colors or shapes or other intrinsic features, as well as whether any of the keys of the keyboard is actuated (e.g., depressed downward or returning upward), or whether the bin or the other item carrier is empty or partially or completely filled with items. After an object or an entity has been detected and recognized within the imaging data, the states or changes in state of the object or the entity may be tracked based on imaging data that is subsequently captured at later points in time. Some classifiers that may be utilized in order to recognize an object or an entity, or to determine a state or a change in state of the object or entity, include but are not limited to support vector machines, Bayes classifiers, neural networks, Random Forest methods, deep learning methods or any other type of machine learning tool, method, algorithm or technique.

Next, using one or more second classifiers that are each specifically configured to identify specific actions or activities, or groups of actions or activities, information regarding the objects or entities within the environment, and the static or dynamic states of such objects or entities, may be used to select one or more actions or activities with which such object or entities, or states or changes in state, are associated. For example, in a fulfillment center environment, such classifiers may be trained to associate the appearance of an item within (or disappearance of the item from) imaging data, as well as the linear or rotational motion (e.g., raising, lowering, side-to-side translation, spinning, tumbling) of bins or item carriers that have been recognized within imaging data with an action or an activity.

Once objects or entities have been recognized from imaging data captured within an environment, and the states of such objects or entities have been determined, information or data regarding the objects or entities and their respective states may be analyzed to identify probabilities that the objects, entities, states or changes in state are associated with one or more predetermined actions or activities. For example, where a number of objects or entities have been identified within a field of view of an imaging device, in various states or conditions, information regarding the objects, the entities, the states or the changes in state, or any other relevant intrinsic or extrinsic information, may be evaluated according to a Hidden Markov Model or other statistical model that is configured to determine a probability that the objects, the entities, the states or the changes in state are associated with a predetermined action or activity at a given time, or within a given time period. From such probabilities, an action or an activity that is most likely associated with the detected and classified motion may be selected.

In this regard, a context of an environment may be identified based on the presence or absence of objects or entities therein, and their respective states, as determined from imaging data captured from the environment, and a set of potential actions or activities that might be occurring within the environment may be narrowed based on the objects or entities that are, or are not, located within the environment, or the states of such objects or entities that are not presently observed.

Some embodiments of the present disclosure may also be utilized to determine a level of productivity associated with the execution of a given process or procedure based on a context of an environment within which the process or procedure is to be performed. The context may be defined based on the presence or absence of one or more objects or entities within a given environment. More specifically, where a process has a predetermined order or sequence of steps that must be completed at specific times, or within predetermined time periods of one another, the systems and methods of the present disclosure may determine whether such steps were completed on time, or within the predetermined time periods, by detecting and recognizing objects or entities that are required in order to complete such steps (e.g., specific tools or implements associated with each step) and the states or changes in state of such objects or entities. The states of such objects or entities identifies based on imaging data may be analyzed to determine a time at which such steps were performed in furtherance of the process, and such times may be compared to one another in order to determine whether each of the steps, or the process as a whole, was timely completed on schedule.

Some other embodiments of the present disclosure may be used to confirm that a worker has properly performed each of the steps of a given process or procedure, or to determine whether the steps of the process or procedure were performed in an appropriate order, based on a context of an environment within which the process or procedure is to be performed. The context may be defined based on the presence or absence of one or more objects or entities within a given environment or the states or changes in state of such objects or entities. For example, the motion of one or more objects or entities within the environment may be tracked and associated with one or more actions or activities, which may then be compared to the one or more steps of the process or procedure. If the actions or activities identified based on the motion of the objects or entities observed within the environment are consistent with each of the steps of the process or procedure, and were performed in the order defined by the process or procedure, then the worker may be deemed to have completed the process or procedure satisfactorily. However, if one of the steps of the process or procedure is not identified as having been performed, if extraneous or unnecessary steps are identified as having been performed, or if the steps of the process or procedure are not performed in the defined order, then the worker may be deemed to have not completed the process or procedure satisfactorily.

Figure 2:
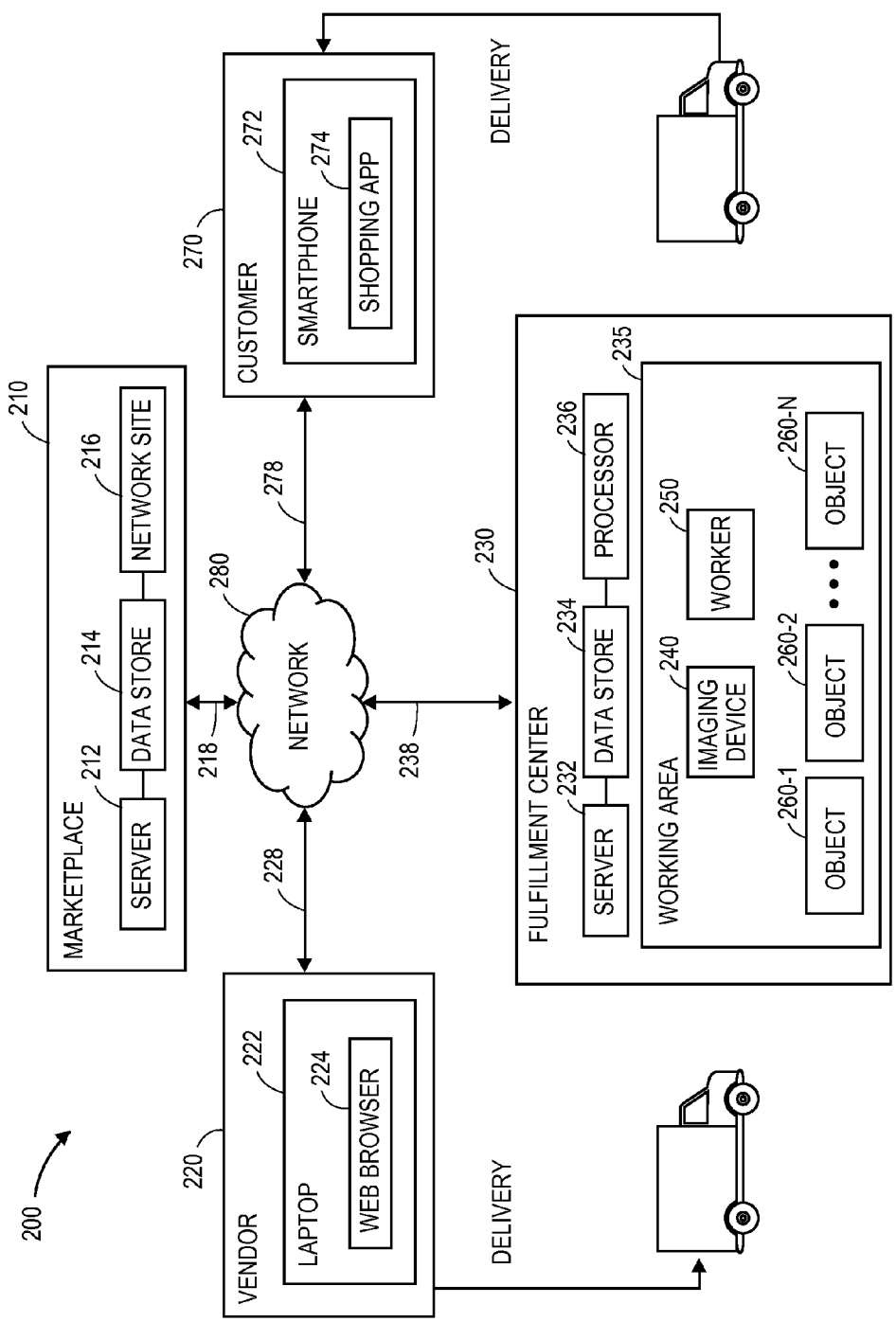
FIG. 2 is a block diagram of components of one system for context-based detection and recognition of actions in accordance with embodiments of the present disclosure.

Referring to FIG. 2, a block diagram of components of one system 200 for context-based detection and recognition of actions in accordance with embodiments of the present disclosure is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data stores 214 may contain any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes a working area 235 having one or more imaging devices 240, one or more workers 250, and a plurality of objects 260-1, 260-2 . . . 260-n therein.

The imaging device 240 may comprise any form of optical recording device that may be used to photograph or otherwise record images of structures, facilities or other elements within the fulfillment center 230, as well as the items within the fulfillment center 230, or for any other purpose. The imaging device 240 may capture one or more still or moving images, as well as any relevant audio signals or other information, within one or more designated locations within the fulfillment center 230, and may be connected to the server 232 or with one another by way of an internal network (not shown). Additionally, the imaging device 240 may be adapted or otherwise configured to communicate with one another, or with the marketplace 210 or the marketplace server 212, the vendor 220 or the vendor laptop 222 or the customer 270 or customer smartphone 272, or to access one or more other computer devices by way of the external network 280. Although the working area 235 of FIG. 2 includes a single imaging device 240, any number or type of imaging devices may be provided in accordance with the present disclosure, including but not limited to digital cameras or other optical sensors.

The fulfillment center 230 may further include one or more workers 250 or staff members within the working area 235 who may handle or transport items within the working area 235 or the fulfillment center 230. The worker 250 may operate one or more computing devices or machines for registering the receipt, retrieval, transportation or storage of items within the fulfillment center, e.g., a general purpose device such a personal digital assistant, a digital media player, a smartphone, a tablet computer, a desktop computer or a laptop computer, which may include any form of input and/or output peripherals such as scanners, readers, keyboards, keypads, touchscreens or like devices. Additionally, the worker 250 may handle or transport items within the working area 235, such as by removing the items from a car, truck, ship or aircraft, placing the items onto a crane, jack, belt or another conveying apparatus at a receiving station, transporting the items to a shelf, bin, rack, tier, bar, hook or other storage means within a storage area, retrieving the items from such a storage means within the storage area, transporting the items to a defined region within a distribution station, and preparing the items for delivery to one or more customers. Alternatively, the worker 250 may also transport, or "cross-dock," items directly from a receiving station to a distribution station.

The objects 260-1, 260-2 . . . 260-n may be any items, structural features, facilities, vehicles, tools, implements, surfaces, pieces of equipment or any other objects within the working area 235. For example, referring again to the working environment 130 of FIG. 1A, the objects 260-1, 260-2 . . . 260-n may include one or more of not only the inbound conveyor 135-1, the workstation 135-2 or the outbound conveyor 135-3 of FIGS. 1A-1D but also the item 160-1, the roll 160-2 of adhesive or the container 160-3, or any other objects or components of the working environment 130, or any other environment. The objects 260-1, 260-2 . . . 260-n may have any size, shape, mass, volume, surface area, texture, color, reflectance, silhouette, surface contour or variations, or any other qualities in accordance with the present disclosure.

The fulfillment center 230 may further operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the imaging device 240, the worker 250 or one or more of the objects 260-1, 260-2 . . . 260-n. Such control systems may also be associated with one or more other computing devices or machines, and may communicate with the marketplace 210, the vendor 220, the worker 250 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center" or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including E-mail or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232 or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the detection and classification of actions within a fulfillment center environment based on a context defined by the presence or absence of one or more objects therein, the systems and methods are not so limited. Rather, the systems and methods disclosed herein may be utilized in any environment in which the detection and classification of actions of any kind, scope or duration is desired, and may be used to detect and classify such actions within any type of scene, or based on the presence or absence of any type of object.

Figure 3:
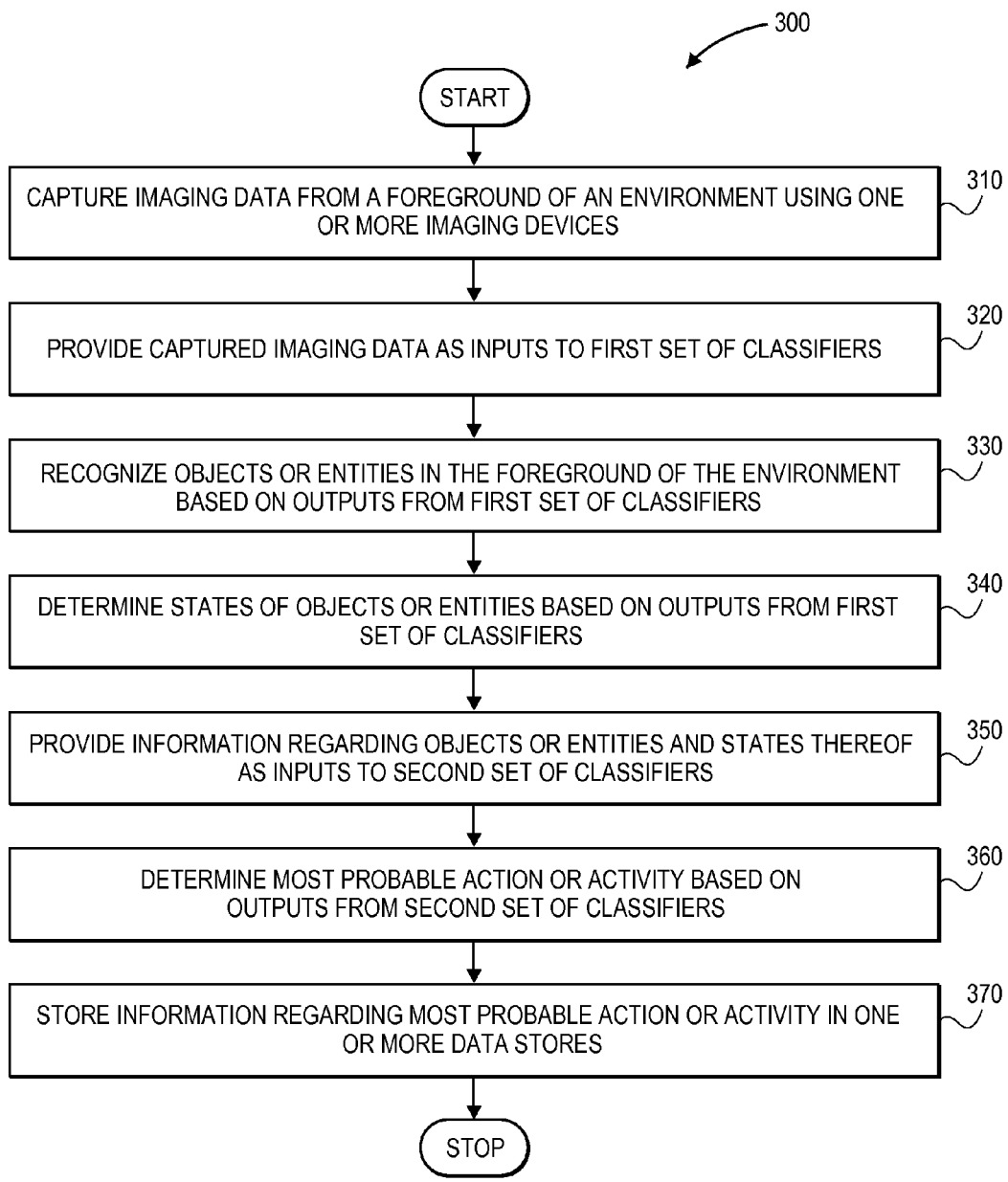
FIG. 3 is a flow chart of one process for context-based detection and recognition of actions in accordance with embodiments of the present disclosure.

As is discussed above, the systems and methods of the present disclosure may be directed to detecting and classifying one or more actions or activities occurring within a scene of an environment by identifying an object or entity from imaging data captured at the scene, determining a state of the object or entity, and associating the state, or any changes in state, of the object or entity with one of the actions or activities. Referring to FIG. 3, a flow chart 300 representing one embodiment of a process for context-based detection and classification of actions in accordance with embodiments of the present disclosure is shown. At box 310, imaging data is captured from a foreground of an environment using one or more imaging devices. Such imaging devices may be provided and configured in the environment in any suitable manner, e.g., mounted above, alongside or below the environment, and may capture imaging data regarding the occurrence of any type of actions or activities therein.

At box 320, the captured imaging data is provided as inputs to a first set of classifiers, and at box 330, the objects or entities in the foreground of the environment may be recognized based on the outputs from the first set of classifiers. Such classifiers may be trained to recognize any type or form of objects or entities, including items, structural features, facilities, vehicles, tools, implements, surfaces, pieces of equipment or any other objects or entities. According to some embodiments, the classifiers to which the captured imaging data is provided may be selected for any purpose based on the environment. For example, where imaging data is captured from a scene at a construction site, the imaging data may be provided to classifiers that are configured to recognize hardware tools (e.g., hammers, saws, drills, sanders and the like). Where imaging data is captured from a scene at a bank, the imaging data may be provided to classifiers that are configure to recognize bank-related objects or entities including but not limited to keyboards, printers, monitors, pens, moneybags, money sacks or carts.

At box 340, states of the objects or entities are determined based on outputs from the first set of classifiers. For example, referring again to the system 100 of FIGS. 1A-1D, a first outline of the container 160-3 observed at time $t_1$ and a second outline of the container 160-3 observed at time $t_2$ may be associated with a first state (e.g., open, empty) and a second state (e.g., sealed, occupying the item 160-1), respectively, of the container 160-3 at time $t_1$ and time $t_2$. At box 350, information regarding the objects or entities recognized at box 330, and the states of the objects or entities determined at box 340, may be provided as inputs to a second set of classifiers. Such classifiers may be trained to interpret the presence or absence of the objects or entities recognized in the foreground of the environment or the states or changes in state of such objects or entities and associate such objects, entities, states or changes with actions or activities. For example, the classifiers of the second set may be configured to determine the probability that any number of various motions of recognized objects represented in the imaging data is consistent with a given action or activity, e.g., the assembly of a cardboard box or container from a flattened sheet with various flaps, the arrival of an autonomous mobile robot, or the use of various instruments during a surgical procedure.

At box 360, a most probable action or activity is determined based on the outputs from the second set of classifiers. For example, the various outputs from the second set of classifiers to which the information regarding the objects, the entities, the states or the changes in state is provided as inputs at box 350 may be scored based on the respective likelihoods that such objects, entities, states or changes are associated with each of a set of actions or activities and that each of the actions or activities is expressed within the imaging data. At box 370, information regarding the most probable action or activity is stored in one or more data stores, and the process ends.

Figure 4:
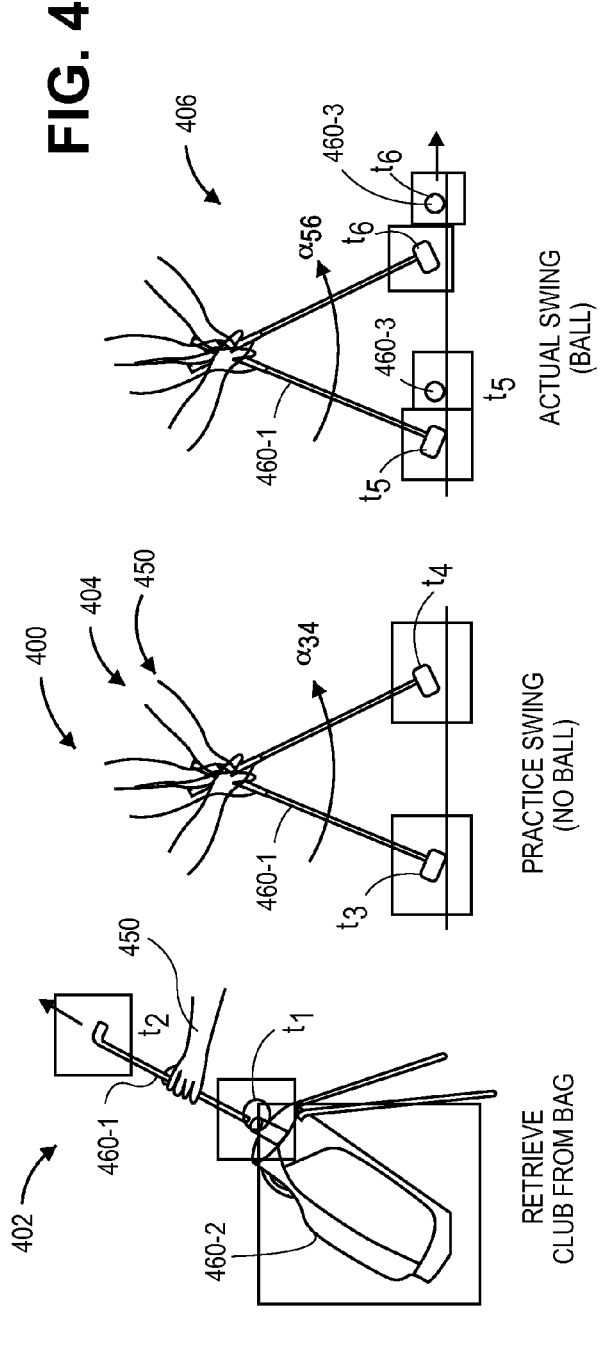
FIG. 4 is a view of aspects of one system for context-based detection and recognition of actions in accordance with embodiments of the present disclosure.
Figure 4:
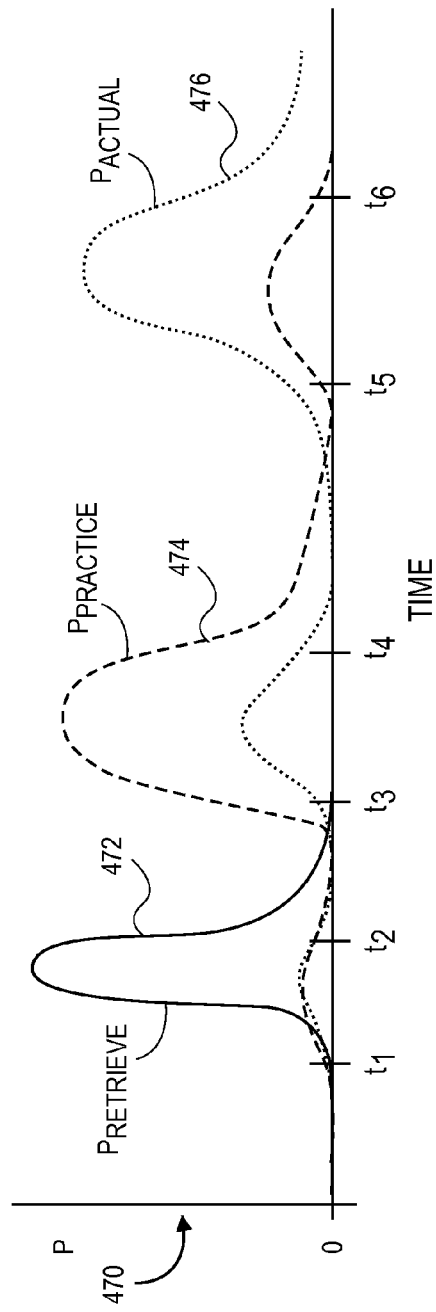

Accordingly, the systems and methods of the present disclosure may predict an action or activity occurring within a scene of an environment by recognizing and tracking objects, rather than humans, within the scene and by associating the objects and their respective states with one or more predetermined actions or activities. The detection and classification of actions based on a context of an environment defined by the presence of one or more objects therein and the states of such objects according to one embodiment of the present disclosure may be shown in FIG. 4. Referring to FIG. 4, a system 400 includes a human actor 450 and objects 460-1, 460-2, 460-3, and a plot 470 of probabilities. Except where otherwise noted, reference numerals preceded by the number "4" shown in FIG. 4 indicate components or features that are similar to components or features having reference numerals preceded by the number "1" shown in the system 100 of FIGS. 1A through 1D.

As is shown in FIG. 4, the actor 450 executes a number of actions using the objects 460-1, 460-2, 460-3 between time $t_1$ and time $t_6$, including a golf club 460-1, a golf bag 460-2 and a golf ball 460-3. In a first scene 402 occurring between time $t_1$ and time $t_2$, the motion of a head of the golf club 460-1 is detected in a substantially vertical direction above the golf bag 460-2. In a second scene 404 occurring between time $t_3$ and time $t_4$, the motion of the head of the golf club 460-1 is identified as following an arcuate path, subtending an angle $\alpha_{34}$. Finally, in a third scene 406 occurring between time $t_5$ and time $t_6$, the motion of the head of the golf club 460-1 is also identified as following an arcuate path, subtending an angle $\alpha_{56}$, and striking the golf ball 460-3, which is stationary at time $t_5$ but in linear motion at time $t_6$.

The systems and methods of the present disclosure are directed to detecting and classifying actions using imaging data captured from a scene in which the objects are located, e.g., by recognizing the objects and their respective states, and by determining a probability that the objects and states are associated with one or more predetermined actions or activities. As is shown in FIG. 4, the plot 470 includes a probability 472 that the motion of the head of the golf club 460-1 is associated with retrieving the golf club 460-1 from the golf bag 460-2, or $P_{RETRIEVE}$, as well as a probability 474 that the motion of the head of the golf club 460-1 is associated with a practice swing of the golf club 460-1, or $P_{PRACTICE}$, and a probability 476 that the motion of the head of the golf club is an actual swing of the golf club 460-1 at a golf ball 460-3, or $P_{ACTUAL}$.

As is shown on the plot 470, the probability 472 that the golf club 460-1 is being retrieved from the golf bag 460-2 is maximized between time $t_1$ and time $t_2$, when the probabilities 474, 476 that the golf club 460-1 is being swung as a practice swing or an actual swing are minimized. One cause for the substantially high probability 472 value between time $t_1$ and time $t_2$ is that the golf club 460-1 is not ordinarily moved in an inverted fashion and in a substantially linear motion during play, such as is shown in the first scene 402, and is usually only moved in such a fashion or such a motion when being retrieved from the golf bag 460-2 or deposited therein.

As is also shown on the plot 470, the probability 474 that the golf club 460-1 is being swung as a practice swing has an absolute maximum between time $t_3$ and time $t_4$, and a local maximum between times $t_5$ and $t_6$. One cause for the times at which the absolute and local maxima of the probability 474 are observed may be the fact that the stroke of the golf club 460-1 is substantially similar during a practice swing and an actual swing, but that a practice swing is typically taken without a golf ball present, while an actual swing is taken with a golf ball present. Based on the absence of the golf ball 460-3 within the second scene 404 between time $t_3$ and time $t_4$, and the presence of the golf ball 460-3 within the third scene 406 between time $t_5$ and time $t_6$, the motion of the golf club 460-1 between time $t_3$ and time $t_4$ may be deemed likely to be a practice swing.

Conversely, as is further shown on the plot 470, the probability 476 that the golf club 460-1 is being swung as an actual swing has a local maximum between time $t_3$ and time $t_4$, and an absolute maximum between times $t_5$ and $t_6$. Based on the presence and subsequent motion of the golf ball 460-3 in the third scene 406 between time $t_5$ and time $t_6$, and the absence of the golf ball 460-3 in the second scene 404 between time $t_3$ and time $t_4$, the motion of the golf club 460-1 between time $t_5$ and time $t_6$ may be deemed likely to be an actual swing.

Figure 5:
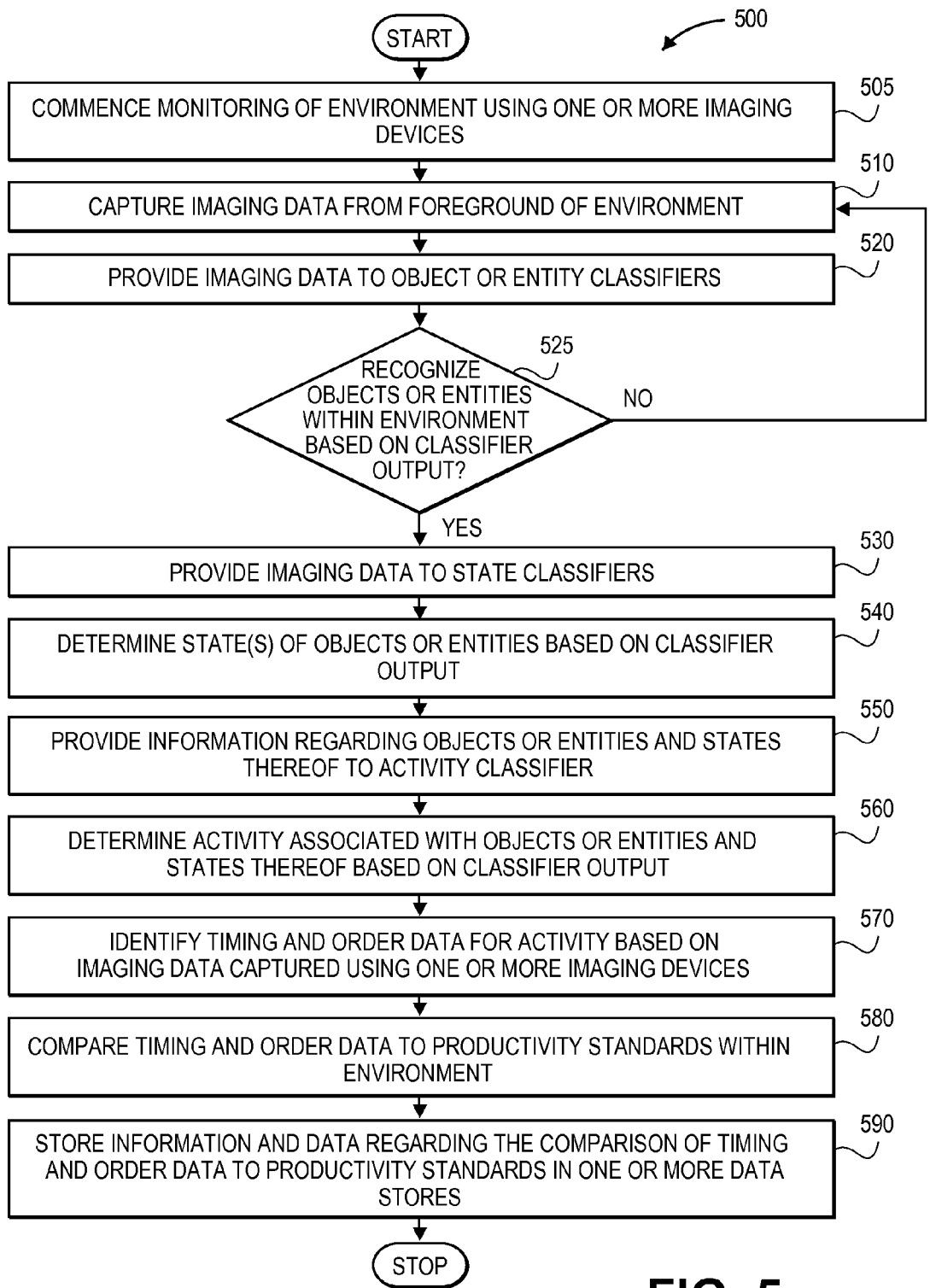
FIG. 5 is a flow chart of one process for context-based detection and recognition of actions in accordance with embodiments of the present disclosure.

As is discussed above, the systems and methods of the present disclosure may be utilized to determine whether the performance of a task satisfies one or more efficiency standards, such as one or more standards concerning the time required to complete the task as a whole, or to complete one or more discrete steps of the task. Referring to FIG. 5, a flow chart 500 representing one embodiment of a process for context-based detection and classification of actions in accordance with embodiments of the present disclosure is shown. At box 505, the monitoring of an environment using one or more imaging devices commences, and at box 510, imaging data is captured from a foreground of the environment. The imaging devices with which the imaging data was captured may be any type or form of imaging device, e.g., a digital camera or depth sensor, and the imaging data may include, for example, one or more still or moving images and any related information, data or metadata.

At box 520, the imaging data is provided to a plurality of object or entity classifiers, e.g., one or more support vector machines or other learning models, each of which is configured to determine whether a specific object or a specific entity is shown or otherwise expressed within the imaging data. At box 525, if no objects or entities are recognized within the environment, e.g., if the environment is empty or devoid of activity, or objects or entities therein are unrecognizable, then the process returns to box 510, where further imaging data is captured from the foreground of the environment.

If any objects or entities are recognized within the environment based on an output of one of the classifiers, then the process advances to box 530, where the imaging data regarding the states of the objects or entities that are recognized is provided to one or more state classifiers. For example, referring again to the system 400 of FIG. 4, once the golf club 460-1, the golf bag 460-2 and/or the golf ball 460-3 are recognized, imaging data regarding the respective objects may be captured and provided to classifiers, which may also be support vector machines or other learning models, to interpret the states of the respective objects. At box 540, the states of the objects or the entities are determined based on outputs from the state classifiers (e.g., the golf club 460-1 is in the golf bag 460-2, the golf club 460-1 is out of the golf bag 460-2, the golf bag 460-2 is occupied, the golf bag 460-2 is empty, the golf ball 460-3 is stationary, the golf ball 460-3 is in linear motion, the golf club 460-1 is in arcuate motion).

At box 550, information regarding the objects or entities and the states thereof is provided to an activity classifier, e.g., a learning model configured to associate objects, entities, states or changes in state with actions or activities. At box 560, an activity with which the objects, the entities, the states or the changes may be associated is determined based on the outputs of the respective classifiers. For example, probabilities that the object, the entities, the states or the changes include or comprise the respective actions or activities may be calculated, and the action or the activity having the highest probability is predicted as having occurred.

At box 570, after the activity associated with the objects or the entities and the states thereof has been determined, timing and order data for the activity is identified from the imaging data captured using the one or more imaging devices. For example, the imaging data may be processed to indicate when specific steps or aspects that are associated with the activity were performed based on the probabilities of the various aspects of the activity involving such objects or entities.

At box 580, the timing and order data is compared to one or more productivity standards associated within the environment. Such standards may specify times at which the steps of a given action or activity are required to be performed, or are preferably performed, as well as minimum or maximum allowable elapsed times between such steps, and an order in which such steps are to be performed. A comparison of the timing and order data identified at box 560 to such standards may be used for any number of reasons or purposes, including but not limited to determining a level of proficiency or efficiency of the actor performing the action or activity. If the timing and order data indicates that the actor is exceeding the relevant standards, then the result of the actor's work may be evaluated to determine whether the actor has identified new efficiencies, or whether the actor should train other actors in the performance of the action or activity. If the timing or order data indicates that the actor is falling short of the relevant standards, however, then the actor may be directed to undertake remedial training or diverted to other tasks, or the action or activity may be reevaluated to determine any potential issues with the existing productivity standards. At box 590, information and data regarding the comparison of the timing and order data to the productivity standards is stored in one or more data stores, and the process ends.

Figure 6B:
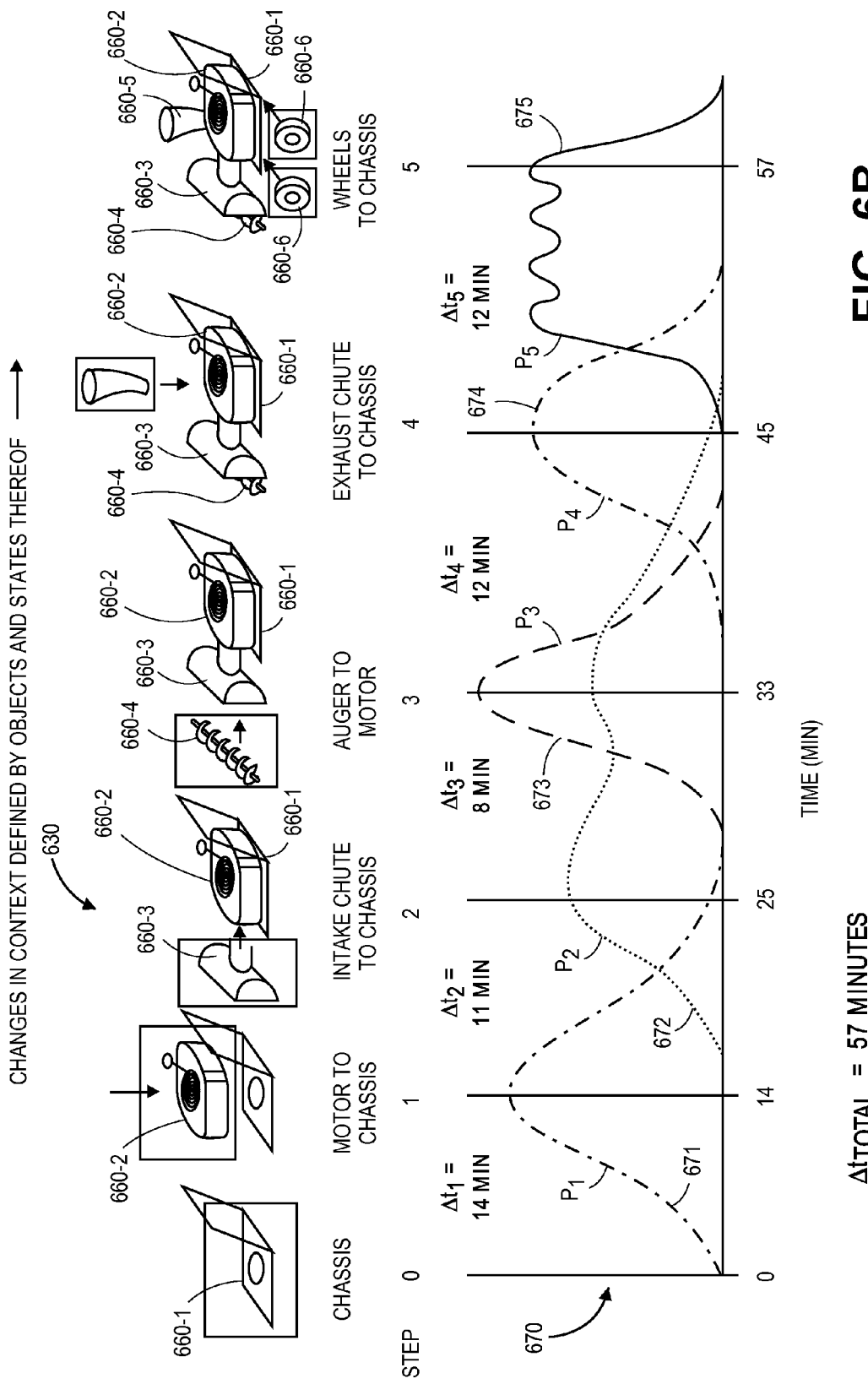

A comparison of timing and order data obtained from an evaluation of imaging data captured during the performance of an action or an activity to one or more predetermined standards may be used to determine the efficiency or efficacy of any type or form of procedure that may be monitored using one or more imaging devices. Referring to FIGS. 6A and 6B, views of aspects of one system 600 for context-based detection and recognition of actions in accordance with embodiments of the present disclosure are shown. Except where otherwise noted, reference numerals preceded by the number "6" shown in FIGS. 6A and 6B indicate components or features that are similar to components or features having reference numerals preceded by the number "4" shown in FIG. 4 or by the number "1" shown in the system 100 of FIGS. 1A through 1D.

FIG. 6A shows a procedure 655 to be followed when assembling a snowblower. The procedure 655 generally entails mounting a motor 660-2 to a chassis 660-1, followed by the mounting of an intake chute 660-3 to the chassis 660-1 and the mounting of an auger 660-4 to the motor 660-2. Next, the procedure 655 calls for mounting an exhaust chute 660-5 to the chassis 660-1, and the mounting of wheels 660-6 to the chassis 660-1. As is shown in FIG. 6A, the mounting of the motor 660-2 to the chassis 660-1 should take approximately fifteen minutes, while the mounting of the intake chute 660-3 to the chassis 660-1 should take approximately five minutes, and the mounting of the auger 660-4 to the motor 660-2 should take approximately ten minutes. As is also shown in FIG. 6A, the mounting of the exhaust chute 660-5 to the chassis 660-1 should take approximately ten minutes, while the mounting of the wheels 660-6 to the chassis 660-1 should take approximately twenty minutes. In total, the assembly of a snowblower according to the procedure 655 should take approximately sixty minutes.

As is discussed above, the systems and methods of the present disclosure may be used to capture imaging data from an environment during the performance of one or more actions or activities in the environment, to recognize contextual cues based on objects present in or absent from the environment during the performance of the actions or activities, to track the states of such objects, to classify the objects or the states as associated with the actions or activities, and to determine the efficiency or suitability of the actions or activities as compared to one or more predetermined standards. Referring to FIG. 6B, a working environment 630 is shown during the assembly of a snowblower according to the procedure 655 of FIG. 6A, and a plot 670 of probabilities 671, 672, 673, 674, 675 associated with the execution of the various steps of the procedure 655 is also shown. The probabilities 671, 672, 673, 674, 675 may be used to determine any changes in the context of the working environment 630 defined by various objects 660-1, 660-2, 660-3, 660-4, 660-5, 660-6 and states thereof, and may be calculated based on the sensed motion or other states of the objects 660-1, 660-2, 660-3, 660-4, 660-5, 660-6, as determined from the imaging data. In particular, the steps may be deemed to have been completed at times associated with relative maxima of the values of the probabilities 671, 672, 673, 674, 675. Further, because the relative maximum probabilities may be understood to correspond with the completion of a step, the time between the relative maxima may represent a time elapsed between such steps, and the time between the initial recognition of a first object and a relative maximum probability of a final step may represent a time elapsed when completing the action or activity.

As is shown in FIG. 6B, a mounting of a motor 660-2 to a chassis 660-1, e.g., a first step of the procedure 655 of FIG. 6A, was predicted to have been completed in fourteen minutes, or one minute faster than required by the procedure 655. A mounting of the intake chute 660-3 to the chassis 660-1, e.g., a second step of the procedure 655 of FIG. 6A, was predicted to have been completed eleven minutes after the mounting of the motor 660-2 to the chassis 660-1, or six minutes slower than required by the procedure 655 of FIG. 6A. A mounting of the auger 660-4 to the motor 660-2, a mounting of the exhaust chute 660-5 to the chassis 660-1, and mountings of the wheels 660-6 to the chassis 660-1 were predicted to have been completed in eight minutes, twelve minutes and twelve minutes, respectively, or two minutes faster, two minutes slower and eight minutes faster, respectively, than required by the procedure 655 of FIG. 6A. In total, however, as is shown in the plot 670, the snowblower was determined to have been assembled in fifty-seven minutes, or three minutes faster than required by the procedure 655 of FIG. 6A.

Thus, as is shown in FIG. 6B, the systems and methods of the present disclosure may not only confirm that an action or an activity has been performed using information regarding a context of an environment defined by the presence or absence and states of objects or entities therein, but also to determine whether the action or the activity was performed in a desired or most efficient manner. The systems and methods of the present disclosure may determine the timing associated with the performance of individual steps of the action or activity, or with the action or activity as a whole, based on the presence or absence of objects, or the states of such objects, within imaging data. Although the steps associated with the assembly of the snowblower shown in FIG. 6A were recognized based on the detection, classification and tracking of various parts of the snowblower, e.g., the chassis 660-1, the motor 660-2, the intake chute 660-3, the auger 660-4, the exhaust chute 660-5 and the wheels 660-6, the systems and methods of the present disclosure may also monitor the presence or absence and states of other objects, e.g., tools or other implements used to assemble the snowblower, such as wrenches, screwdrivers or pliers, and determine whether one or more steps of the procedure 655 have been completed satisfactorily based on such objects.

Additionally, as is also discussed above, the systems and methods of the present disclosure may determine whether the various actions or activities occurring within an environment comply with established standards or procedures. For example, based on the presence or absence of objects within an environment, and the states or changes in states of the objects, e.g., changes in position or orientation of the objects caused by one or more types of motion, as determined from imaging data captured from the environment, some embodiments of the systems and methods disclosed herein may identify one or more actions or activities occurring within the environment and determine whether such actions or activities are being performed in compliance with procedural, safety or quality requirements, such as the use of proper tools or equipment to accomplish tasks.

Figure 7:
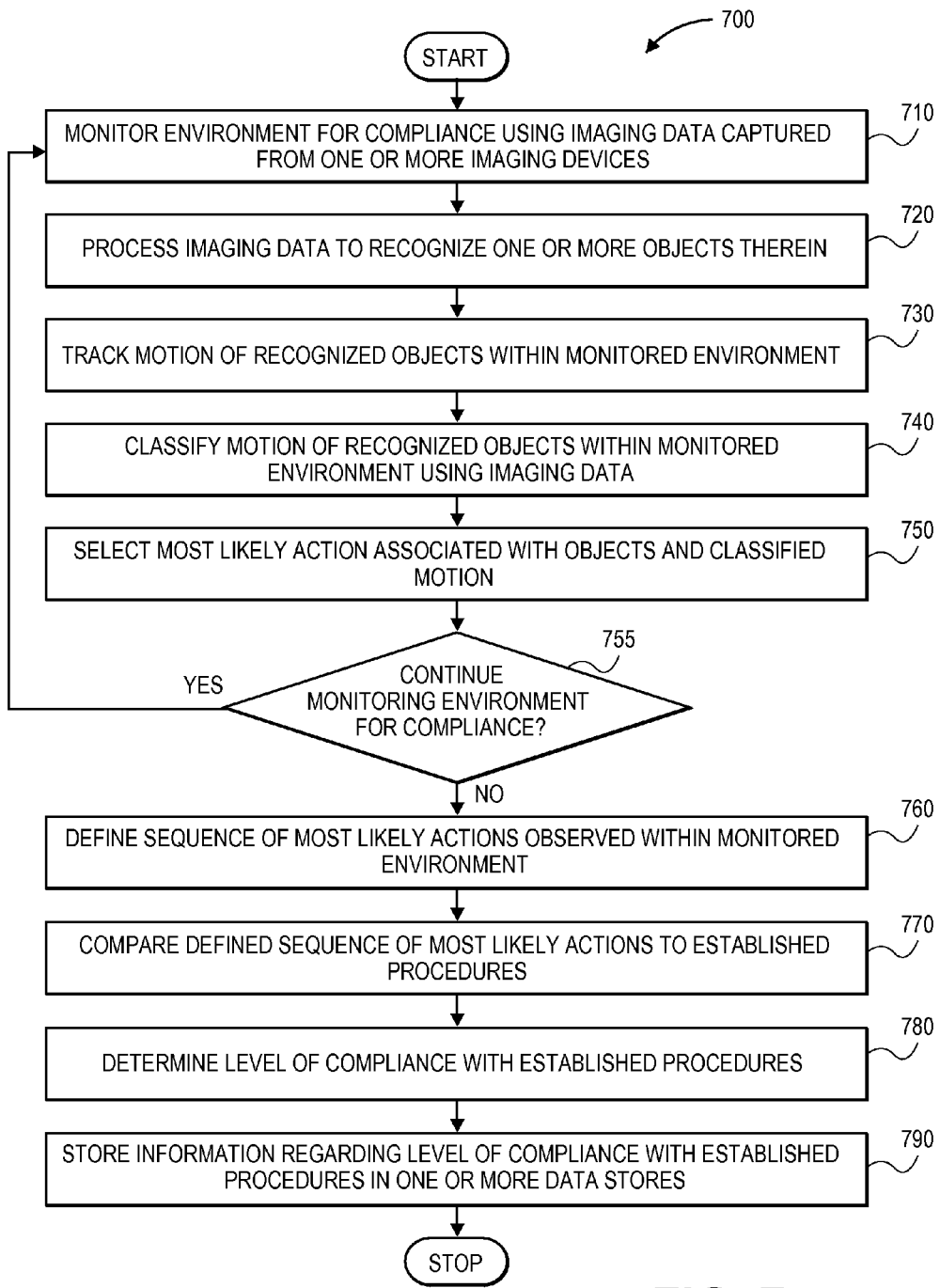
FIG. 7 is a flow chart of one process for context-based detection and recognition of actions in accordance with embodiments of the present disclosure.

Referring to FIG. 7, a flow chart 700 representing one embodiment of a process for context-based detection and classification of actions in accordance with embodiments of the present disclosure is shown. At box 710, an environment is monitored for compliance using imaging data captured from one or more imaging devices, which may be provided in any appropriate alignment or configuration with regard to the environment being monitored and the actions or activities that may be anticipated there. For example, the imaging devices may be mounted above a fulfillment center, a warehouse or another like facility, or alongside an ingress or egress point at a transportation station, or in any other desired alignment or configuration.

At box 720, the imaging data may be processed to recognize one or more objects therein. The imaging data may be analyzed in order to identify one or more edges, contours, outlines, colors, textures, silhouettes, shapes or other characteristics of such objects, e.g., by providing the imaging data to one or more classifiers that are trained to recognize individual objects therein. At box 730, the motion of the objects may be tracked within the monitored environment, such as by providing imaging data to one or more classifiers that are specifically configured to recognize one or more types of motion of the objects recognized at box 720. Such classifiers may be support vector machines or other models that are trained to recognize and distinguish between various types of motion of the objects within the environment, e.g., the raising, lowering, translating, rotating, twisting or pivoting of such objects, based on historical observations of the objects within the environment or in other environments.

At box 740, the motion of the recognized objects within the monitored environment is classified using the imaging data, and at box 750, a most likely action associated with the objects and the classified motion is selected. Probabilities that the tracked motion of an identified object or other changes in states are associated with a given action may be determined using a Hidden Markov Model or other statistical means, and the action most likely associated with the objects and the classified motion, e.g., the action having the highest probability, may be selected as the action that is predicted to have occurred. Such actions may correspond to a specific step of a predetermined process or procedure, or to multiple steps of the process or procedure.

At box 755, whether the continued monitoring of the environment for compliance is desired is determined. If the monitoring of the environment is desired, the process returns to box 710, where the environment is monitored using imaging data captured from the one or more imaging devices. If the monitoring of the environment is no longer desired, then the process advances to box 760, where a sequence of the most likely actions to have been observed within the monitored environment is determined. The sequence may comprise each of the most likely actions selected based on such motions, or a subset of such actions, and may be defined based at least in part on any relevant intrinsic or extrinsic factor.

At box 770, the sequence of the most likely actions defined at box 760 is compared to one or more established procedures. For example, where the sequence of actions is associated with operating a crane or erecting scaffolding, which require the establishment of safety regions using temporary fencing or other barricades, the sequence of likely actions may be evaluated to determine whether such fencing or barricades were installed, or whether such regions were established. Where the sequence of actions is associated with performing a task such as trimming weeds or blowing leaves using powered equipment that requires the wearing of safety goggles and/or ear protection, the sequence of actions may be evaluated to determine whether such goggles or ear protection were worn. Where the sequence of actions is associated with an activity requiring the pounding of nails or the driving of screws, the sequence of actions may be evaluated to determine whether the nails were pounded with a hammer or the screws were driven with a screwdriver.

At box 780, a level of compliance with the established procedures is determined. The level of compliance may be determined in a qualitative (e.g., using signal words such as "complaint" or "non-compliant," or words indicative of a level of quality such as "above-average," "average" or "below-average") or quantitative (e.g., numerical or percent-based) form, and may be based on the number of the most likely actions performed, the order in which such actions were performed, the objects or entities used to execute such actions, as compared to the established procedures, or any other relevant factors. For example, if a task is completed by performing fewer than or more than the steps required by the established procedures, a level of compliance that takes into account the number and type of steps performed may be determined. If the use of a particular object (e.g., a tool or implement) to perform one or more of the steps is required, and the object is not used to perform one or more of the steps, a level of compliance that takes into account the objects that were used to perform the steps, or the objects that were not so used, may be determined. At box 790, information regarding the level of compliance with the established procedures is stored in one or more data stores, and the process ends.

Figure 8A:
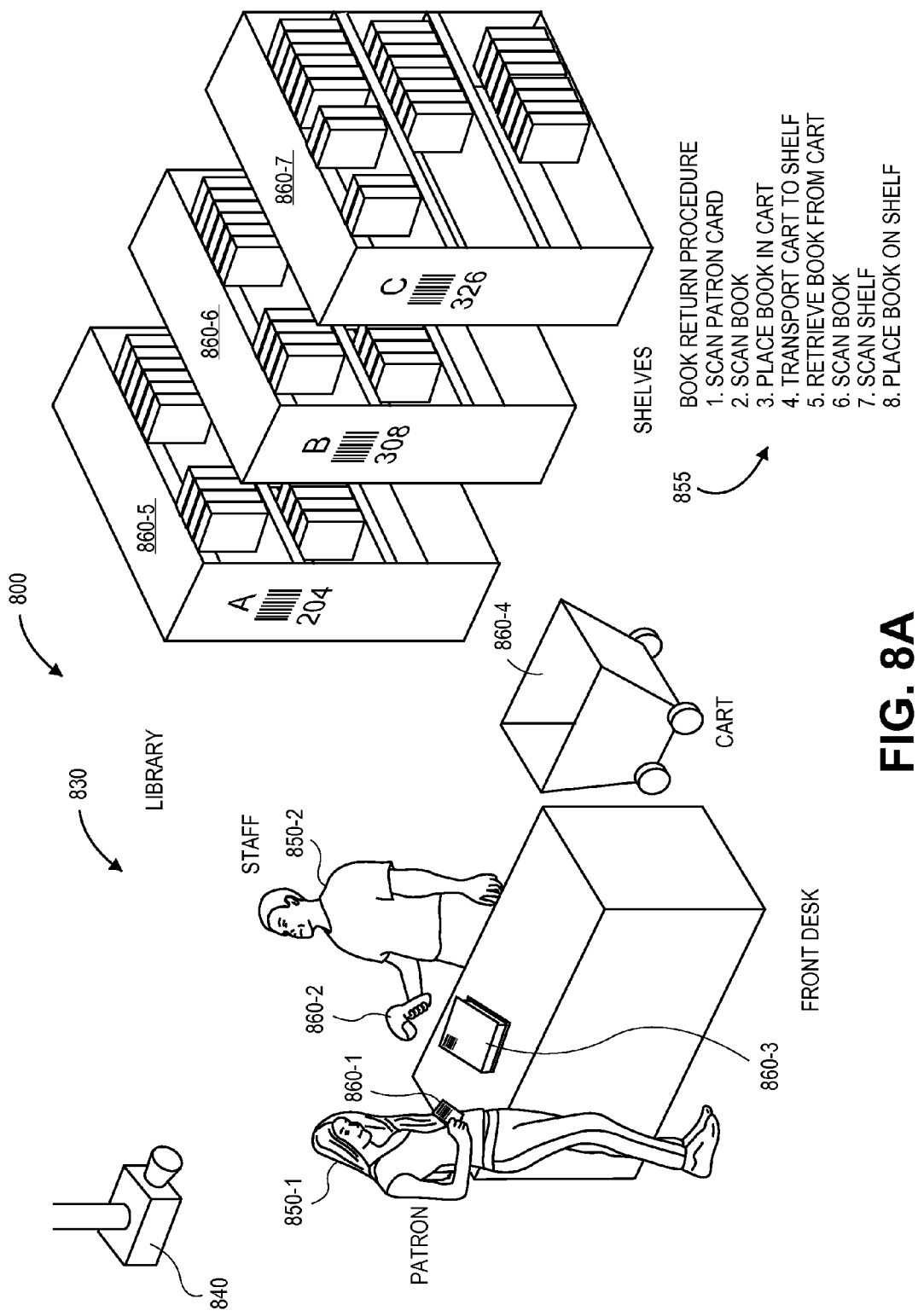

The use of embodiments of the present disclosure to determine whether the performance of one or more actions or activities complies with one or more established procedures may be shown in FIGS. 8A and 8B. Referring to FIGS. 8A and 8B, a system 800 includes a library 830 having an imaging device 840, a patron 850-1, a staff member 850-2 and a plurality of objects 860-1 through 860-7, including a library card 860-1, a handheld scanner 860-2, a book 860-3, a cart 860-4 and three shelves 860-5, 860-6, 860-7. Within the library 830, a procedure 855 for returning books, such as the book 860-3, has been defined. First, the library card 860-1 of the patron 850-1 is scanned using the handheld scanner 860-2. Next, the book 860-3 is scanned using the handheld scanner 860-2. Then, the book 860-3 is placed in the cart 860-4, which is transported to one or more of the shelves 860-5, 860-6, 860-7. When the cart 860-4 arrives, the book 860-3 is retrieved from the cart, the book 860-3 and the one of the shelves 860-5, 860-6, 860-7 where the book is to be deposited are scanned using the handheld scanner 860-2, and the book 860-3 is placed on the one of the shelves 860-5, 860-6, 860-7.

As is discussed above, the systems and methods of the present disclosure may predict whether one or more steps of a predefined action or activity has been performed based on the presence or absence of one or more objects associated with such steps within imaging data captured from an environment, and based on the tracked motion of such objects, which may then be evaluated to determine whether each of the steps was performed satisfactorily. Referring to FIG. 8B, a plot 870 of the probabilities 871, 872, 873, 874 that each of the observed motions is associated with one of the steps of the procedure 855 of FIG. 8A, as determined based on imaging data captured from the library 830 using the imaging device 840, is shown. The plot 870 shows a local maximum of a first probability 871 based on the recognition of the library card 860-1 and the scanner 860-2 and the scanning of the library card 860-1 by the scanner 860-2. The plot 870 also shows a local maximum of a second probability 872 based on the recognition of the scanner 860-2 and the book 860-3, and the scanning of the book 860-3 by the scanner 860-2. The plot 870 further includes a local maximum of a third probability 873 based on the recognition of the book 860-3 and the cart 860-4, and the placement of the book 860-3 into the cart 860-4. Finally, the plot 870 further includes a local maximum of a fourth probability based on the recognition of the book 860-3 and the shelf 860-6, and the placement of the book 860-3 onto the shelf 860-6.

Those of ordinary skill in the pertinent art will recognize that the maxima of the probabilities 871, 872, 873, 874 shown in the plot 870 of FIG. 8B predicts not only that the first, second, third and eighth steps of the procedure 855 of FIG. 8A were performed but also that the fourth, fifth, sixth and seventh steps of the procedure 855 of FIG. 8A were not performed. Therefore, by detecting and classifying one or more objects within the imaging data captured from the environment 830, and tracking the motion of such objects, the systems and methods of the present disclosure may confirm that while the underlying goal of the procedure 855, viz., the return of the book 860-3 to a shelf 860-6, has been accomplished, one or more steps of the procedure 855 have not been completed satisfactorily. Information or data regarding the steps of the procedure 855 that have been completed, and the steps of the procedure 855 that have not been completed, may be used for any number of purposes, including but not limited to determining whether the procedure 855 is appropriate, e.g., whether the staff member 850-2 has identified a more efficient manner to effectuate the underlying goal, or whether the staff member 850-2 requires remedial training or encouragement in this regard.

The systems and methods of the present disclosure have a number of possible uses or applications, as the recognition of human actions, behavior or activities from observed objects or entities within a scene of an environment, e.g., tools or implements used by an actor, may be particularly valuable. For example, some embodiments of the systems and methods disclosed herein may be provided in surveillance or monitoring systems that are configured to generate alarms, triggers, notifications or logs of activities based on the use of one or more objects in the performance of one or more activities. Other embodiments may be provided in monitoring systems that are configured to analyze video footage for the presence or absence of objects, anomalous or otherwise, during the performance of one or more activities. For example, such systems may detect objects within video data files (e.g., clips of video data of any duration) and register such objects as references for the performance of expected tasks or actions in a process. Likewise, any industrial automation system that uses visual means to detect permissible or impermissible activities by human actors or autonomous robots may also incorporate one or more of the embodiments disclosed herein to detect such activities and derive feedback based on the location and motion of one or more objects associated with such activities.

Any detection system that is configured to preemptively predict actions or activities occurring within a scene may benefit from one or more of the embodiments disclosed herein. For example, tool tracking and recommendation systems that are provided to track the use of tools in the performance of an activity, or to predict a tool that may be required to perform further steps of the activity, may detect, classify and track one or more tools expressed within imaging data and associate the tools with individual steps of the activity. Likewise, home monitoring or security systems may utilize one or more of the embodiments disclosed herein to detect or recognize static objects, or motion that is initiated regarding such objects, and to associate such motion with either permissible actions or impermissible actions accordingly. Moreover, one or more of the embodiments disclosed herein may be used to automatically index video data files of a personal nature that are captured from a variety of scenes or environments by recognizing specific objects expressed therein, e.g., a baseball bat, a fishing rod, or a crib, and to automatically label such files with appropriate tags such as "Little League," "deep sea fishing trip," or "baby photos" accordingly. Any content-indexing and retrieval system may be enhanced using one or more of the embodiments disclosed herein, such as by classifying such content with one or more activity types such as "surfing," "golfing," "cooking," "sports" or "racing" based on the objects such as surf boards, golf clubs, stoves or other cooking implements, balls or other sporting accessories, or automobiles moving at a high rate of speed expressed within such files.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of digital cameras posted in fulfillment centers, the systems and methods disclosed herein are not so limited, and utilize any type of imaging device applied in any environment and for any purpose. Additionally, while many of the embodiments disclosed herein are directed to determining an action or an activity performed by a human actor, those of ordinary skill in the pertinent arts will readily recognize that such systems and methods may be further utilized to determine actions or activities performed by non-human actors, such as race horses, guide dogs, or animals in the wild as well as machinery, equipment, robotics or the like.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. For example, although the process represented by the flow chart 700 of FIG. 7 contemplates tracking the motion of recognized objects within a monitored environment, those of ordinary skill in the pertinent arts will recognize that the systems and methods disclosed herein may be used to identify and track any type of state, or any change in state, of any type of object or entity and in any type of environment. Moreover, with respect to the one or more methods or processes of the present disclosure described herein, including but not limited to the flow charts shown in FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A monitoring system comprising:
   a plurality of imaging devices; and
   a computing device in communication with at least one of the plurality of imaging devices,
   wherein the computing device is configured to implement one or more services, and
   wherein the one or more services are configured to:
      cause a first set of imaging data to be captured by at least one of the plurality of imaging devices;
      provide at least a portion of the first set of imaging data as an input to at least one first classifier, wherein the at least one first classifier is configured to recognize at least one object within the first set of imaging data;
      recognize the at least one object within the imaging data based at least in part on an output from the at least one first classifier;
      recognize a state of the at least one object based at least in part on the output from the at least one first classifier;
      provide information regarding the at least one object and the state of the at least one object as an input to at least one second classifier, wherein the at least one second classifier is configured to associate at least one of the object or the state of the at least one object with one of a predetermined number of actions or activities;
      identify at least one action or activity based at least in part on an output from the at least one second classifier; and
      store information regarding the action or the activity in at least one data store.

2. The monitoring system of claim 1, wherein the at least one first classifier is configured to recognize at least one of an edge, a contour, an outline, a color, a texture, a silhouette or a shape within the imaging data.

3. The monitoring system of claim 2, wherein the at least one first classifier is configured to determine whether the at least one of the edge, the contour, the outline, the color, the texture, the silhouette or the shape within the imaging data is associated with the at least one object, and
   wherein the at least one first classifier is one of
   a trained support vector machine;
   a Bayes classifier;
   a neural network;
   a Random Forest method; or
   a deep learning method.

4. The monitoring system of claim 1, wherein the at least one second classifier is configured to calculate a probability that the state of the at least one object is associated with the at least one of the predetermined number of actions or activities, and
   wherein the one or more services are further configured to:
      select the one of the predetermined number of actions or activities having a highest probability.

5. The monitoring system of claim 1, wherein the predetermined number of actions or activities comprises at least one of:
   receiving the at least one object;
   changing a position of the at least one object;
   inspecting the at least one object;
   identifying a container for the at least one object;
   placing the at least one object into the container; or
   sealing the container with the at least one object therein.

6. A computer-implemented method comprising:
   identifying information regarding an object within a scene of an environment based at least in part on imaging data captured from the environment;
   identifying information regarding a state of the object within the scene of the environment based at least in part on the imaging data captured from the environment;
   providing the information regarding the object and the information regarding the state of the object to at least one first classifier as inputs;
   receiving at least one output from the at least one first classifier;
   identifying at least one action or activity associated with the object or the state of the object based at least in part on the at least one output from the at least one first classifier; and
   storing information regarding the at least one action or activity in at least one data store.

7. The computer-implemented method of claim 6, wherein the at least one first classifier is configured to determine whether at least one of the object or the state of the object is associated with one of a plurality of predetermined actions or activities.

8. The computer-implemented method of claim 6, wherein identifying the information regarding the state of the object within the scene of the environment further comprises:
   tracking motion of the object within the imaging data,
   wherein the information regarding the state of the object within the scene of the environment is identified based at least in part on the tracked motion of the object within the imaging data, and
   wherein the at least one action or activity associated with the object or the state of the object is identified based at least in part on the tracked motion.

9. The computer-implemented method of claim 7, wherein identifying the at least one action or activity associated with the object or the state of the object further comprises:
   determining a probability that each of the plurality of predetermined actions or activities is associated with at least one of the object or the state of the object based at least in part on the at least one output from the at least one first classifier; and
   selecting the one of the plurality of predetermined actions or activities having a highest probability,
   wherein the at least one action or activity is associated with the selected one of the predetermined actions or activities.

10. The computer-implemented method of claim 9, further comprising:
    determining a time at which the selected one of the predetermined actions or activities has the highest probability; and
    associating the time with a performance of the selected one of the predetermined actions or activities having the highest probability.

11. The computer-implemented method of claim 10, further comprising:
   determining times at which the probability that each of at least two of the predetermined actions or activities is associated with at least one of the object or the state of the object exceed a predetermined threshold; and
   associating each of the times with a performance of a respective one of the at least two of the plurality of predetermined actions or activities.

12. The computer-implemented method of claim 11, further comprising:
   identifying a productivity standard associated with the at least two of the plurality of predetermined actions or activities; and
   determining whether each of the at least two of the plurality of predetermined actions or activities complies with the productivity standard based at least in part on the times.

13. The computer-implemented method of claim 11, further comprising:
   identifying an established procedure associated with the object or the state of the object; and
   determining whether the established procedure associated with the object or the state of the object comprises the at least two of the plurality of predetermined actions or activities.

14. The computer-implemented method of claim 13, wherein determining whether the established procedure associated with the object or the state of the object comprises the at least two of the plurality of predetermined actions or activities comprises:
   determining whether the established procedure associated with the object or the state of the object consists of the at least two of the plurality of predetermined actions or activities.

15. The computer-implemented method of claim 6, wherein identifying the information regarding the object within the scene of the environment based at least in part on the imaging data captured from the environment comprises:
   detecting the at least one object in the imaging data using at least one computer processor.

16. The computer-implemented method of claim 15, wherein detecting the at least one object in the imaging data comprises:
   providing at least some of the imaging data as an input to at least one second classifier,
   wherein the at least one second classifier is configured to recognize at least one of an edge, a contour, an outline, a color, a texture, a silhouette or a shape within the imaging data.

17. The computer-implemented method of claim 16, wherein the state of the object is at least one of:
   empty;
   full;
   open;
   closed;
   in motion; or
   stationary.

18. A non-transitory computer-readable medium having computer-executable instructions stored thereon,
   wherein the instructions, when executed, cause a computer system having at least one computer processor and at least one data store to perform a method comprising:
   identifying imaging data captured from at least one imaging device provided in an environment;
   providing at least a portion of the imaging data as an input to at least one classifier;
   recognizing at least one object within the portion of the imaging data based at least in part on an output of the at least one classifier;
   classifying a state of the at least one object based at least in part on the output of the at least one classifier;
   identifying a plurality of activities associated with the classified state;
   identifying at least one standard associated with the classified state;
   determining whether the classified state complies with the at least one standard; and
   upon determining that the classified state complies with the at least one standard,
      storing an indication that at least one of the object or the classified state complies with the at least one standard in at least one data store.

19. The non-transitory computer-readable medium of claim 18, wherein the method further comprises:
   determining an order in which each of the plurality of activities was performed,
   wherein the at least one standard comprises a predetermined order of the plurality of activities, and
   wherein determining whether the classified state complies with the at least one standard further comprises:
   determining whether the order in which each of the plurality of activities was performed is consistent with the predetermined order.

20. The non-transitory computer-readable medium of claim 18, wherein the method further comprises:
   determining a time at which each of the plurality of activities was performed,
   wherein the at least one standard comprises a respective predetermined time at which each of the plurality of activities is to be performed, and
   wherein determining whether the classified state complies with the at least one standard further comprises:
   determining whether each of the plurality of activities occurred at the respective predetermined time.

21. The computer-implemented method of claim 12, wherein determining whether each of the at least two of the plurality of predetermined actions or activities complies with the productivity standard further comprises:
   defining an order of the at least two of the plurality of predetermined actions or activities based at least in part on the times; and
   determining whether each of the at least two of the plurality of predetermined actions or activities complies with the productivity standard based at least in part on the order.

* * * * *